US012668421B2

(12) United States Patent (10) Patent No.: US 12,668,421 B2
Havel et al. (45) Date of Patent: Jun. 30, 2026

(54) GRIPPING DEVICE

(71) Applicant: Ocado Innovation Limited, Hatfield (GB)

(72) Inventors: Marek Havel, Hatfield (GB); Matthew Harman, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 375 days.

(21) Appl. No.: 18/256,674

(22) PCT Filed: Dec. 13, 2021

(86) PCT No.: PCT/EP2021/085544
§ 371 (c)(1),
(2) Date: Jun. 9, 2023

(87) PCT Pub. No.: WO2022/128947
PCT Pub. Date: Jun. 23, 2022

(65) Prior Publication Data
US 2024/0034558 A1 Feb. 1, 2024

(30) Foreign Application Priority Data

Dec. 14, 2020 (GB) ..................................... 2019717

(51) Int. Cl.
*B65G 1/04* (2006.01)
*B66D 1/50* (2006.01)
*B66C 13/10* (2006.01)

(52) U.S. Cl.
CPC ............. *B65G 1/0464* (2013.01); *B66D 1/50* (2013.01); *B65G 2201/0235* (2013.01); *B66C 13/10* (2013.01)

(58) Field of Classification Search
CPC .......... B65G 1/0464; B65G 2201/0235; B66C 13/10; B66D 1/50
(Continued)

(56) References Cited

U.S. PATENT DOCUMENTS

| | | | | |
|---|---|---|---|---|
| 3,785,511 A | * | 1/1974 | Bonnamy | ............... B66C 13/02 |
| | | | | 254/290 |
| 4,470,355 A | * | 9/1984 | Kunczynski | .......... B61B 12/007 |
| | | | | 198/813 |

(Continued)

FOREIGN PATENT DOCUMENTS

| | | |
|---|---|---|
| CN | 201010391 Y | 1/2008 |
| CN | 110239871 A | 9/2019 |

(Continued)

OTHER PUBLICATIONS

Office Action issued on Jun. 7, 2022, by the Great Britain Patent Office in corresponding Great Britain Patent Application No. GB2118002.1. (6 pages),.

(Continued)

*Primary Examiner* — James Keenan
(74) *Attorney, Agent, or Firm* — Gregory Matt McCloskey

(57) ABSTRACT

A gripping device for being suspended from a load handling device for lifting and moving containers stacked in stacks in a grid storage structure including a plurality of tracks arranged in a grid pattern above the stacks of containers. The gripping device includes a frame; a gripping mechanism mounted on the frame configured to releasably grip a container from below the frame; a fixing device mounted on the frame configured to fix a free end of a reeled cable; and a cable tensioner configured to put the cable under tension in use. The cable tensioner includes a track; a carriage slidably mounted on the track; and a biasing device configured to bias the carriage.

18 Claims, 16 Drawing Sheets

(58) Field of Classification Search
USPC ................................. 187/264; 254/277, 392
See application file for complete search history.

(56) References Cited

U.S. PATENT DOCUMENTS

| | | | | |
|---|---|---|---|---|
| 4,671,494 | A * | 6/1987 | Makino .................... | B66D 1/58 |
| | | | | 254/277 |
| 5,556,195 | A * | 9/1996 | Glebe ..................... | F21V 21/38 |
| | | | | 362/418 |
| 7,389,973 | B1 * | 6/2008 | Chou ....................... | B66D 1/50 |
| | | | | 254/338 |
| 8,215,618 | B2 * | 7/2012 | Kochan .................... | B66D 1/14 |
| | | | | 362/404 |
| 10,418,263 | B2 | 9/2019 | Kesil | |
| 2013/0248297 | A1 * | 9/2013 | Manes ................. | G11B 17/225 |
| | | | | 187/254 |
| 2021/0139239 | A1 | 5/2021 | Austrheim | |

FOREIGN PATENT DOCUMENTS

| | | |
|---|---|---|
| JP | S62167112 A | 7/1987 |
| JP | 2007120593 A | 5/2007 |
| WO | 2015185628 A2 | 12/2015 |
| WO | 2019206482 A1 | 10/2019 |
| WO | 2019206488 A1 | 10/2019 |
| WO | 2020094339 A1 | 5/2020 |

OTHER PUBLICATIONS

Office Action issued on Nov. 14, 2024, by the Canadian Patent Office in corresponding Canadian Patent Application No. 3,205,063. (4 pages),.

Office Action (Examination Report No. 1) issued on Jun. 25, 2024, by the Australian Patent Office in corresponding Australian Patent Application No. 2021399016. (4 pages).

International Search Report (PCT/ISA/210) and Written Opinion (PCT/ISA/237) mailed on Apr. 4, 2022, by the European Patent Office as the International Searching Authority for International Application No. PCT/EP2021/085544.

Patent Act 1977: Search Report under Section 17 in corresponding Patent Application No. GB2019717.4 dated Jun. 8, 2021.

Office Action issued on Apr. 26, 2026 by the Chinese Patent Office in corresponding Chinese Application No. 202180093528.6 (20 pages) corresponding to Applicant's U.S. Appl. No. 18/256,674.

* cited by examiner

1

31                                    31 z
y
x (a)

(b)

(a)

(b)

GRIPPING DEVICE

TECHNICAL FIELD

The present invention relates to the field of gripping devices. More specifically, the present invention relates to gripping devices for load handling devices that lift and move storage containers stacked in stacks in a grid storage structure.

BACKGROUND

Some commercial and industrial activities require systems that enable the storage and retrieval of a large number of different products. WO2015/185628A describes a storage and fulfilment system in which stacks of storage containers are arranged within a grid storage to structure. The containers are accessed from above by load handling devices operative on rails or tracks located on the top of the grid framework structure.

The load handling devices are typically equipped with a gripping device for releasably gripping a storage container at the top of a stack and a lifting mechanism for raising and lowering the container.

A situation can occur where the gripping device is obstructed from properly aligning and engaging with the top of container in a stack. This could lead to the gripping device failing to grip the container, or could lead to the gripping device insecurely gripping only a portion of the top of the container.

The present invention aims to provide improvements to gripping devices used by load handling devices.

SUMMARY OF INVENTION

In a first aspect, the present invention provides a gripping device for being suspended from a load handling device for lifting and moving containers stacked in stacks in a grid storage structure comprising a plurality of tracks arranged in a grid pattern above the stacks of containers, the gripping device comprising:

a frame having a top side and a bottom side, the frame comprising a substantially downwardly extending peripheral wall defining at least one opening through the top side and bottom side of the frame; and a gripping mechanism mounted to the peripheral wall and configured to releasably grip a container from below the frame.

The gripping device may further comprise at least one electrical and/or electronic component occupying a portion of the opening The frame may be substantially rectangular. The at least one opening may be substantially rectangular.

The peripheral wall may further define at least one depression in the bottom side of the frame and the at least one opening may extend into the depression. The depression may be substantially rectangular. The peripheral wall may extend substantially horizontally on the top side of the frame to define the depression.

The frame may further comprise a bridge member extending across the frame between two opposing sides of the peripheral wall. The bridge member may extend centrally across the frame. The bridge member may have a bottom surface that is recessed relative to the bottom of the peripheral wall.

At least one electrical and/or electronic component may be mounted on or within the bridge member. The at least one electrical and/or electronic component may comprise a printed circuit board, a processor, and/or an electrical cable or wire.

The gripping mechanism may comprise at least one gripper extending below the peripheral wall for releasably gripping a container from below the frame. The gripping mechanism may comprise a gripping assembly having at least two grippers and a single linear actuator, wherein the single linear actuator is coupled to the at least two grippers by a linkage assembly such that actuation of the single linear actuator actuates the at least two grippers substantially simultaneously. The gripping assembly may be mounted at one end of the frame. In particular, the at least two grippers and optionally the linear actuator may be mounted on the peripheral wall at one end of the frame. The gripping mechanism may comprise two gripping assemblies mounted at opposing ends of the frame.

The gripping device may comprising at least one sensor for detecting the distance between the frame and an object located below the frame. The at least one sensor may be mounted on the peripheral wall. The gripping device may comprise a sensor for each gripping assembly.

The gripping device may further comprise at least one guide member mounted to the frame and extending below the frame for being received by a corresponding portion of a container for aligning the frame with the container. The guide member may extend further below the frame than the gripping mechanism, in particular the grippers of the gripping mechanism. The gripping device may comprise a plurality of guide members, each guide member mounted at a respective corner of the frame.

The gripping device may have a substantially planar shape.

The present invention also provides a load handling device for lifting and moving containers stacked in stacks in a grid storage structure comprising a plurality of tracks arranged in a grid pattern above the stacks of containers, the load handling device comprising:

a body;

a driving mechanism operatively arranged for moving the body on the tracks of the grid storage structure;

a gripping device according to the first aspect of the invention for releasably gripping a container in a stack in the grid storage structure; and a lifting mechanism configured to raise and lower the gripping device relative to the body.

The body may house at least part of the driving mechanism.

In a second aspect, the present invention provides a gripping device for being suspended from a load handling device for lifting and moving containers stacked in stacks in a grid storage structure comprising a plurality of tracks arranged in a grid pattern above the stacks of containers, the gripping device comprising:

a frame having a top side and a bottom side; and at least one gripping assembly mounted on the frame comprising:

at least two grippers, each gripper of the at least two grippers configured to engage a container located below the frame, each gripper being movable between a gripping position for gripping the container and a release position for releasing the container; and a single linear actuator coupled to the at least two grippers by a linkage assembly such that actuation of the single linear actuator drives the at least two grippers substantially simultaneously from the gripping position to the release position and/or from the release position to the gripping position.

In some embodiments of the second aspect, each gripper of the at least two grippers may comprise a pair of legs pivotally mounted to the frame so as to be movable away from each other to define an open configuration corresponding to either the gripping position or the release position and toward each other to define a closed configuration corresponding to the other of the gripping position and the release position, each leg of the pair of legs comprising a foot configured to engage the container when the gripper is in the gripping position. The open position may correspond to the gripping position and the closed configuration may correspond to the release position.

The legs in each pair of legs may be engaged with each other such that pivotal rotation of one of the legs in each pair of legs causes pivotal rotation of the other leg in each pair of legs in an opposite direction. The legs in each pair of legs may be in meshed engagement with each other. For example, the legs in each pair of legs may comprise teeth in meshed engagement with each other. This includes one leg in each pair comprising one tooth in meshed engagement with a corresponding recess on the other leg in the pair.

The linkage assembly may comprise a linkage arm engaged with one leg from each pair of legs. Linear movement of the linkage arm by the linear actuator may cause the at least two grippers to move between the open and closed configurations substantially simultaneously.

The feet of the legs in each pair of legs may extend in opposite directions away from each other.

The at least one gripping assembly may be mounted along one end of the frame. The gripping device may comprise a first gripping assembly mounted along one end of the frame and a second gripping assembly mounted along an opposing end of the frame.

In alternative embodiments of the second aspect, each gripper of the at least two grippers may comprise a single leg, each leg being linearly movable in a horizontal direction relative to the frame between the gripping position and the release position. Each leg may comprise a foot configured to engage the container when the gripper is in the gripping position.

The at least two grippers may be resiliently biased in one direction, i.e. towards either the gripping position or the release position. The linear actuator may be configured to drive the at least two grippers against the resilient bias in the opposite direction, i.e. to the other of the gripping position and the release position. The at least two grippers may be resilient biased by a spring. Alternatively, the linear actuator may be configured to drive the at least two grippers in both directions, i.e. between the gripping position and the release position.

The linkage assembly may comprise a linkage arm engaged between the legs of the at least two grippers. The linkage arm may be integrally formed with the at least two grippers.

The at least one gripping assembly may be mounted along one end of the frame. The gripping device may comprise a first gripping assembly mounted along one end of the frame and a second gripping assembly mounted along an opposing end of the frame. The feet of the first gripping assembly may point in the opposite direction to the feet of the second gripping assembly. The at least two grippers of the first gripping assembly may move in the opposite direction to the at least two grippers of the second gripping assembly when moving between the gripping and release positions.

In embodiments of the second aspect, each leg may extend below the frame and each foot is located below the frame.

Each foot may comprise an upward-facing engagement surface for engaging with a downward-facing engagement surface of the container.

The at least two grippers may lie substantially in the same vertical plane. The linear actuator may be mounted on the frame adjacent to the at least two grippers. The frame may comprise a peripheral wall on which the at least one gripping assembly and the linear actuator are mounted. The linear actuator may have a longitudinal body aligned parallel to the vertical plane in which the grippers lie (i.e. the body has a longitudinal axis aligned parallel to the actuation direction of the linear actuator and the longitudinal axis of the body is aligned parallel to the vertical plane in which the grippers lie).

The gripping device may further comprise at least one guide member mounted to the frame for being received by a corresponding portion of a container for aligning the frame with the container. The at least one guide member may extend further below the frame than the grippers of the at least one gripping assembly. The gripping device may comprise a plurality of guide members, each guide member mounted to a respective corner of the frame.

The frame may have a rectangular shape.

The present invention also provides a load handling device for lifting and moving containers stacked in stacks in a grid storage structure comprising a plurality of tracks arranged in a grid pattern above the stacks of containers, the load handling device comprising:

a body;

a driving mechanism operatively arranged for moving the body on the grid framework;

a gripping device according to the second aspect for releasably gripping a container in a stack in the grid storage structure; and a lifting mechanism configured to raise and lower the gripping device relative to the body.

The body may house at least part of the driving mechanism.

In a third aspect, the present invention provides a gripping device for being suspended from a load handling device for lifting and moving containers stacked in stacks in a grid storage structure comprising a plurality of tracks arranged in a grid pattern above the stacks of containers, the gripping device comprising:

a frame;

a gripping mechanism mounted on the frame configured to releasably grip a container from below the frame;

a fixing device mounted on the frame configured to fix a free end of a reeled cable; and a cable tensioner configured to put the cable under tension in use, the cable tensioner comprising:

a track mounted on the frame;

a carriage slidably mounted on the track and configured to engage the cable in use; and a biasing device configured to bias the carriage towards one end of the track in a direction away from the fixing device so as to put the cable under tension when the carriage is engaged with the cable in use.

The biasing device may comprise a spring, e.g. a coil spring, e.g. a tension spring or a compression spring. One end of the spring may be coupled to the carriage and the other end of the spring may be fixed relative to the frame or track.

The cable tensioner may further comprise a roller mounted on the carriage configured to engage the cable in use. The roller may be an idler roller.

The carriage may be movable along the track to a stop position under the bias of the biasing device. The cable tensioner may further comprise a detector configured to detect when the carriage is at the stop position. The gripping device may further comprise a processor configured to control operation of the gripping device and the detector may be configured to send a signal to the processor when the detector has detected that the carriage is at the stop position. The processor may be configured to stop or halt operation of the gripping device in response to the signal from the detector. The detector may comprise a mechanical switch, e.g. a micro switch.

The fixing device may be a clamp.

The cable tensioner may be at least partially housed by a portion of the frame and the frame may define an aperture for receiving the cable into said portion of the frame. The cable tensioner may further comprise a cover rigidly mounted to the carriage and configured to cover the aperture in the frame for the full range of travel of the carriage on the track. The cover may define a smaller aperture (i.e. smaller than the aperture in the frame) in communication with the aperture in the frame for receiving the cable.

The present invention also provides a load handling device for lifting and moving containers stacked in stacks in a grid storage structure comprising a plurality of tracks arranged in a grid pattern above the stacks of containers, the load handling device comprising:

a body;

a driving mechanism operatively arranged for moving the body on the tracks of the grid storage structure;

a gripping device according to the third aspect for releasably gripping a container in a stack in the grid storage structure; and a lifting mechanism configured to raise and lower the gripping device relative to the body.

The body may house at least part of the driving mechanism.

The load handling may further comprising a cable having a first end arranged on a reel located on or in the body of the load handling device, and a second end fixed by the fixing device to the frame of the gripping device, wherein the cable is engaged with the cable tensioner between the first and second ends.

The cable may change direction at the cable tensioner. The cable may change directions by substantially 90 degrees. The cable may extend substantially vertically between the reel and the cable tensioner and may extend substantially horizontally between the cable tensioner and the fixing device.

The cable may be configured to transfer power from the body of the load handling device to the gripping device and/or transfer data between the body of the load handling device and the gripping device. The cable may be a flexible flat cable.

A gripping device according to the present invention may combine any or all of the first to third aspects defined above. For example, a gripping device according to the present invention may have an opening as defined in the first aspect and/or a gripping mechanism as defined in the second aspect and/or a cable tensioner as defined in the third aspect.

BRIEF DESCRIPTION OF THE DRAWINGS

Aspects and example embodiments of the present invention will now be described with reference to the accompanying drawings.

DETAILED DESCRIPTION

Figure 1:
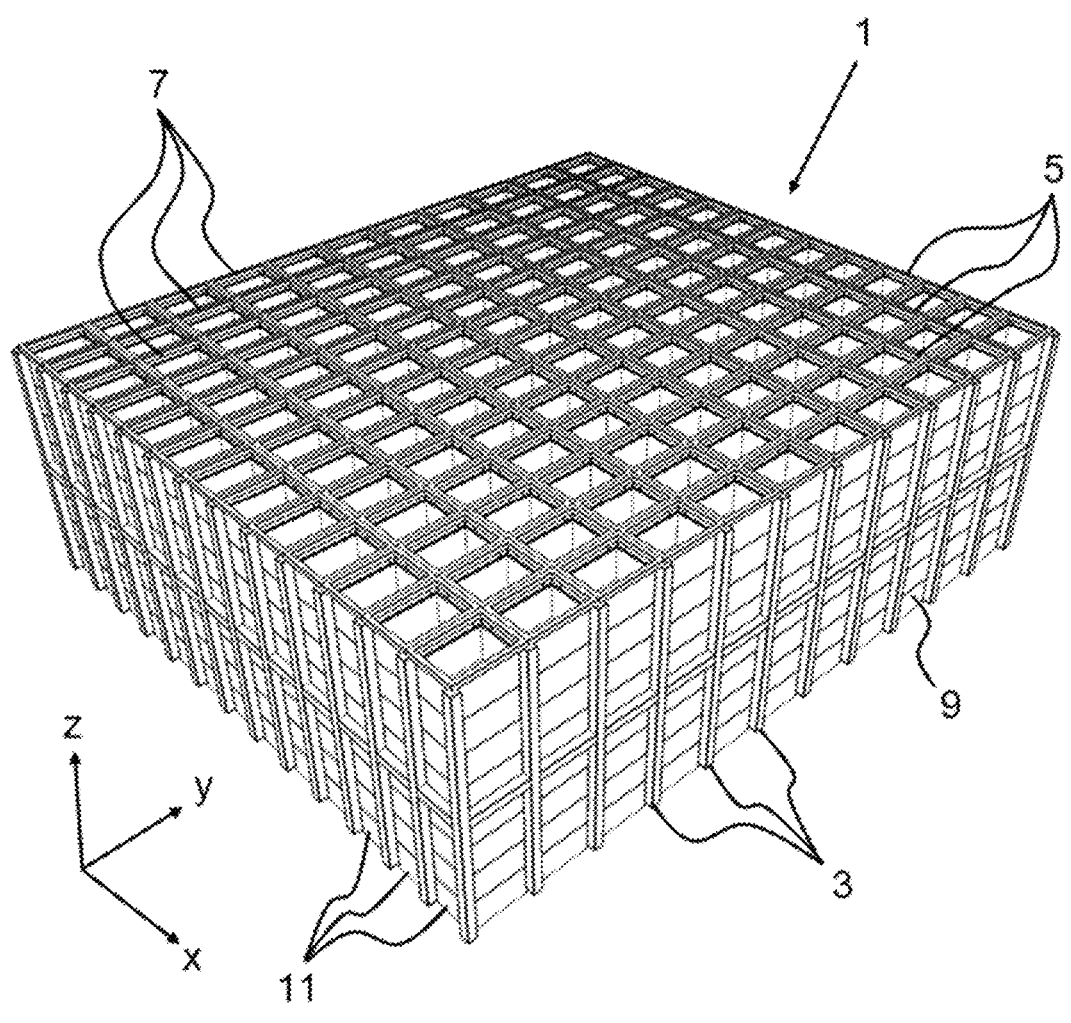
FIG. 1 is a schematic perspective view of a grid storage structure and containers.

FIG. 1 illustrates a storage structure 1 comprising upright members 3 and horizontal members 5, 7 which are supported by the upright members 3. The horizontal members 5 extend parallel to one another and the illustrated x-axis. The horizontal members 7 extend parallel to one another and the illustrated y-axis, and transversely to the horizontal members 5. The upright members 3 extend parallel to one another and the illustrated z-axis, and transversely to the horizontal members 5, 7. The horizontal members 5, 7 form a grid pattern defining a plurality of grid cells. In the illustrated example, storage containers 9 are arranged in stacks 11 beneath the grid cells defined by the grid pattern, one stack 11 of containers 9 per grid cell.

Figure 2:
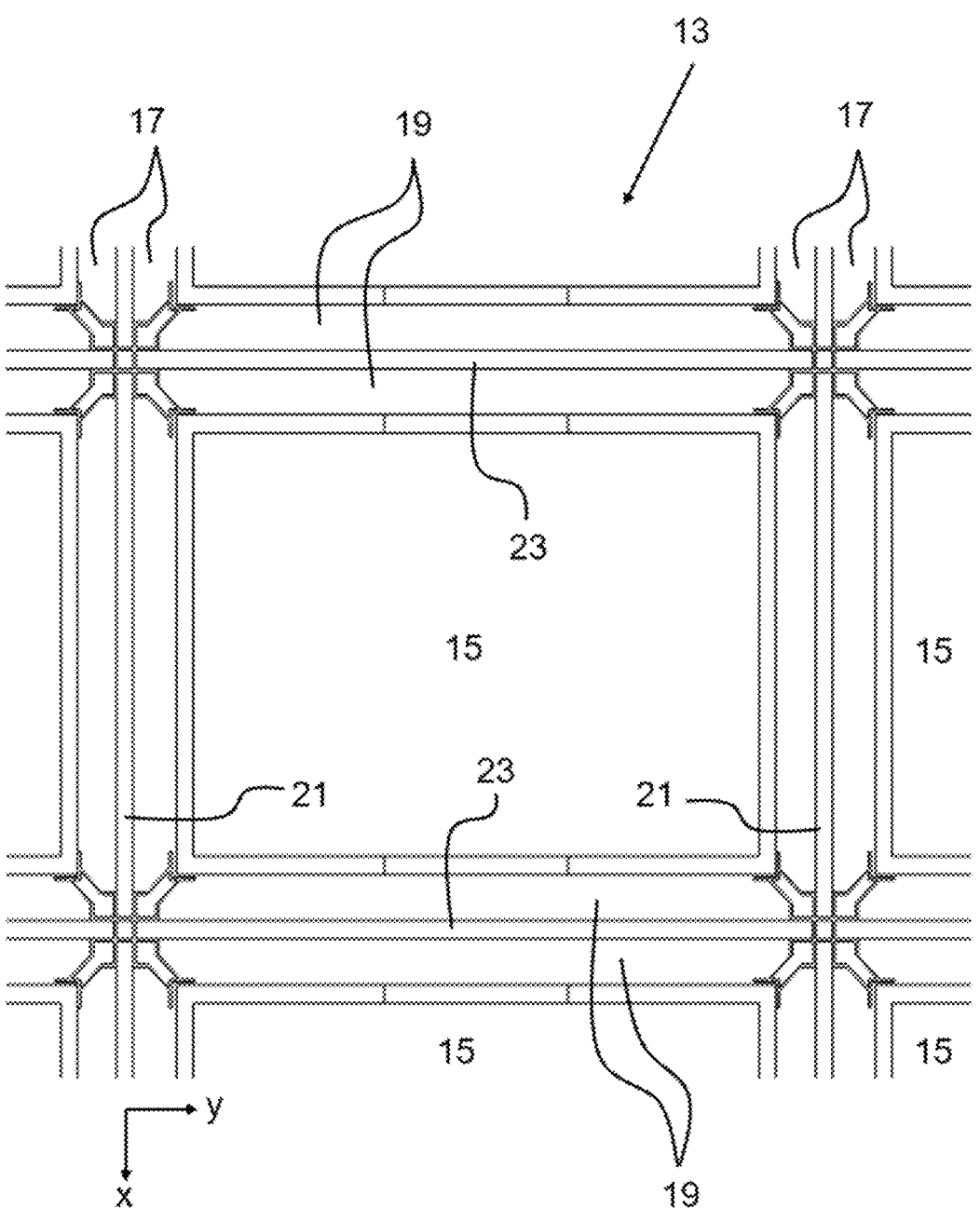
FIG. 2 is a schematic plan view of a track on top of the storage structure of FIG. 1.

FIG. 2 shows a large-scale plan view of a section of track structure 13 forming part of the storage structure 1 illustrated in FIG. 1 and located on top of the horizontal members 5, 7 of the storage structure 1 illustrated in FIG. 1. The track structure 13 may be provided by the horizontal members 5, 7 themselves (e.g. formed in or on the surfaces of the horizontal members 5, 7) or by one or more additional components mounted on top of the horizontal members 5, 7. The illustrated track structure 13 comprises x-direction tracks 17 and y-direction tracks 19, i.e. a first set of tracks 17 which extend in the x-direction and a second set of tracks 19 which extend in the y-direction, transverse to the tracks 17 in the first set of tracks 17. The tracks 17, 19 define apertures 15 at the centres of the grid cells. The apertures 15 are sized to allow containers 9 located beneath the grid cells to be lifted and lowered through the apertures 15. The x-direction tracks 17 are provided in pairs separated by channels 21, and the y-direction tracks 19 are provided in pairs separated by channels 23. Other arrangements of track structure may also be possible.

Figure 3:
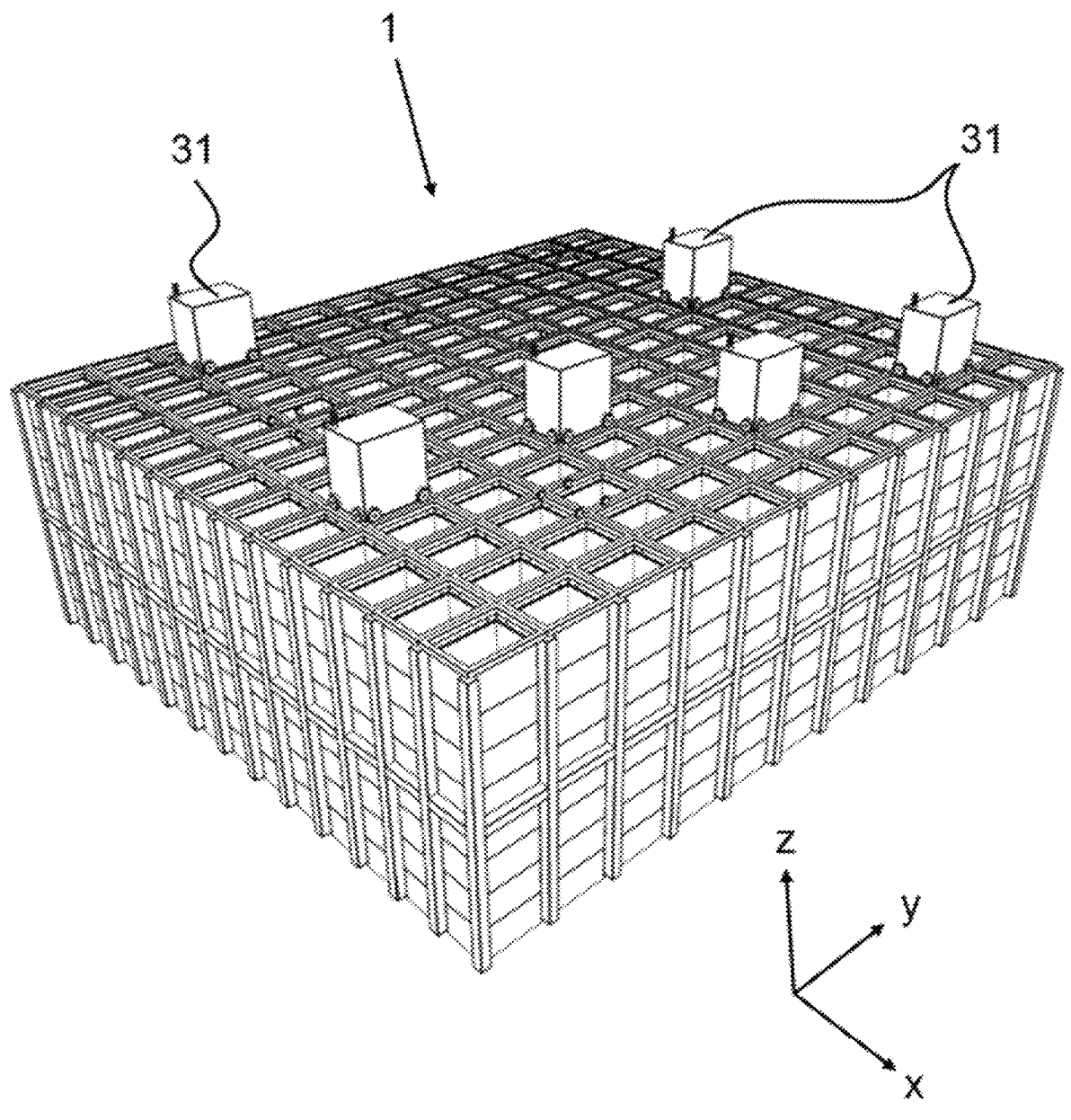
FIG. 3 shows load handling devices on top of the storage structure of FIG. 1.

FIG. 3 shows a plurality of load handling devices 31 moving on top of the storage structure 1 illustrated in FIG. 1. The load handling devices 31, which may also be referred to as robots or bots, are provided with sets of wheels to engage with corresponding x- or y-direction tracks 17, 19 to enable the bots 31 to travel across the track structure 13 and reach specific grid cells. The illustrated pairs of tracks 17, 19 separated by channels 21, 23 allow bots 31 to occupy (or pass one another on) neighbouring grid cells without colliding with one another.

Figure 4:
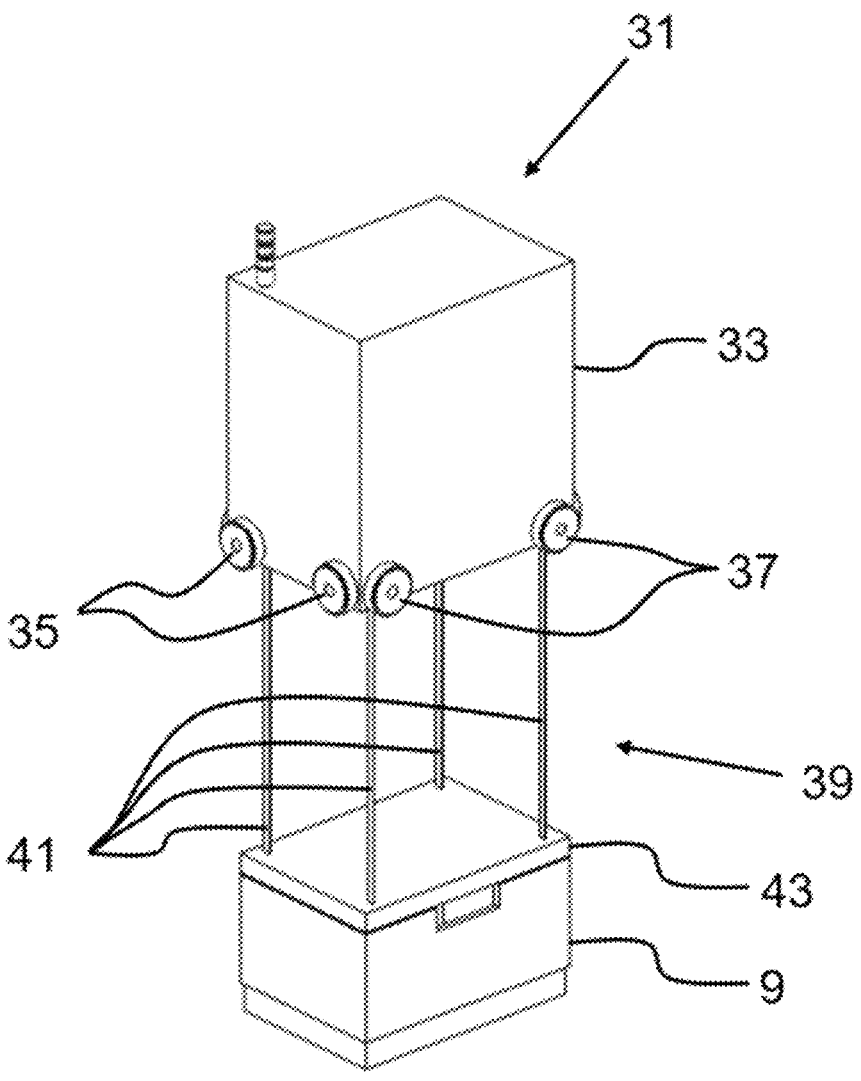
FIG. 4 is a schematic perspective view of a single load handling device with a lifting mechanism in a lowered configuration.

As illustrated in FIG. 4, a bot 31 comprises a body 33 in or on which are mounted one or more components which enable the bot 31 to perform its intended functions. These functions may include moving across the storage structure 1 on the track structure 13 and raising or lowering containers 9 (e.g. from or to stacks 11) so that the bot 31 can retrieve or deposit containers 9 in specific locations defined by the grid pattern.

The illustrated bot 31 comprises first and second sets of wheels 35, 37 which are mounted on the body 33 of the bot 31 and enable the bot 31 to move in the x- and y-directions along the tracks 17 and 19, respectively. In particular, two wheels 35 are provided on the shorter side of the bot 31 visible in FIG. 4, and a further two wheels 35 are provided on the opposite shorter side of the bot 31 (not visible in FIG. 4). The wheels 35 engage with tracks 17 and are rotatably mounted on the body 33 of the bot 31 to allow the bot 31 to move along the tracks 17. Analogously, two wheels 37 are provided on the longer side of the bot 31 visible in FIG. 4, and a further two wheels 37 are provided on the opposite longer side of the bot 31 (not visible in FIG. 4). The wheels 37 engage with tracks 19 and are rotatably mounted on the body 33 of the bot 31 to allow the bot 31 to move along the tracks 19.

The bot 31 also comprises a lifting mechanism 39 configured to raise and lower containers 9. The illustrated lifting mechanism 39 comprises four tethers 41 which are connected at their lower ends to a gripping device 43. The tethers 41 may be in the form of cables, ropes, tapes, or any other form of tether with the necessary physical properties to lift the containers 9. The gripping device 43 comprises a gripping mechanism 150 configured to engage with features of the containers 9. For example, the containers 9 may be provided with one or more apertures in their upper sides with which the gripping mechanism can engage. Alternatively or additionally, the gripping mechanism may be configured to hook under the rims or lips of the containers 9, and/or to clamp or grasp the containers 9. The tethers 41 may be wound up or down to raise or lower the gripping device 43, as required. One or more motors or other means may be provided to effect or control the winding up or down of the tethers 41.

Figure 5:
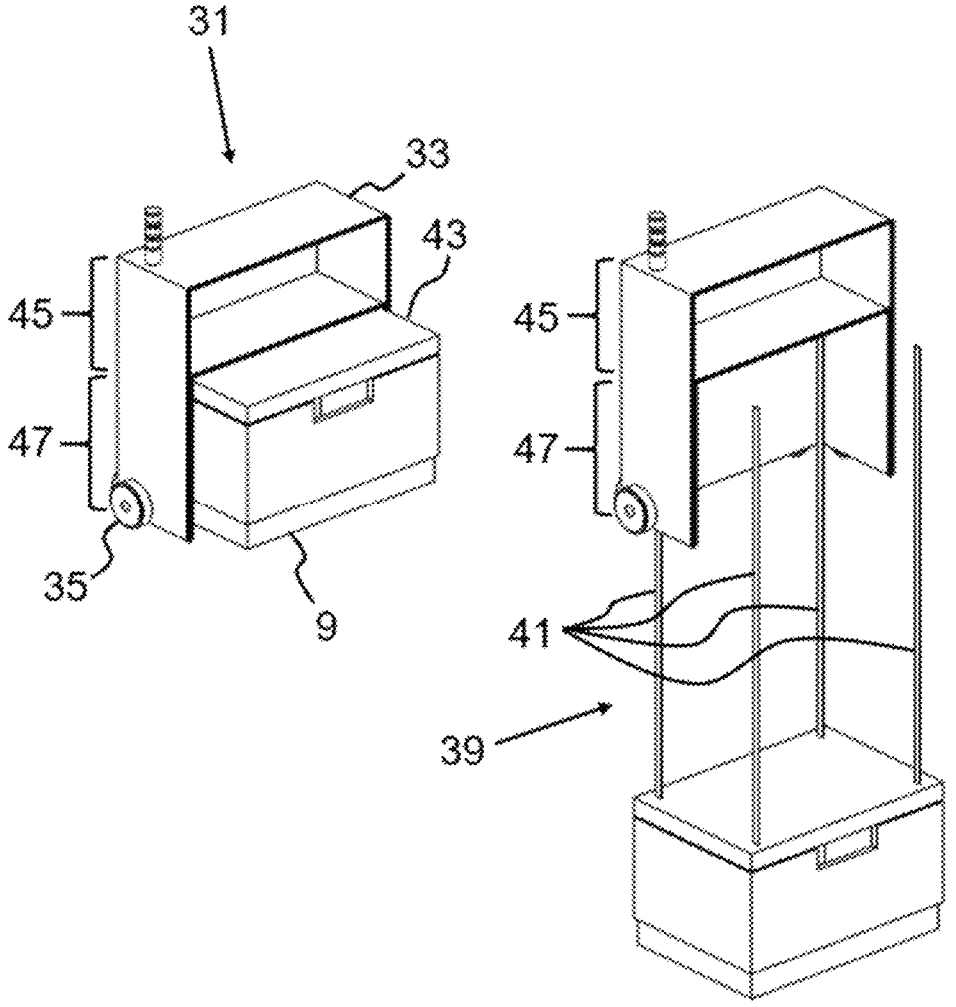
FIG. 5 shows schematic cutaway views of the load handling device of FIG. 4 with the lifting to mechanism in a raised and a lowered configuration.

As can be seen in FIG. 5, the body 33 of the illustrated bot 31 has an upper portion 45 and a lower portion 47. The upper portion 45 is configured to house one or more operation components (not shown). The lower portion 47 is arranged beneath the upper portion 45. The lower portion 47 comprises a container-receiving space or cavity for accommodating at least part of a container 9 that has been raised by the lifting mechanism 39. The container-receiving space is sized such that enough of a container 9 can fit inside the cavity to enable the bot 31 to move across the track structure 13 on top of storage structure 1 without the underside of the container 9 catching on the track structure 13 or another part of the storage structure 1. When the bot 31 has reached its intended destination, the lifting mechanism 39 controls the tethers 41 to lower the gripping device 43 and the corresponding container 9 out of the cavity and into the intended position. The intended position may be a stack 11 of containers 9 or an egress point of the storage structure 1 (or an ingress point of the storage structure 1 if the bot 31 has moved to collect a container 9 for storage in the storage structure 1). Although in the illustrated example the upper and lower portions 45, 47 are separated by a physical divider, in other embodiments, the upper and lower portions 45, 47 may not be physically divided by a specific component or part of the body 33 of the bot 31.

The container-receiving space of the bot 31 may not be within the body 33 of the bot 31. For example, the container-receiving space may instead be adjacent to the body 33 of the bot 31, e.g. in a cantilever arrangement with the weight of the body 33 of the bot 31 counterbalancing the weight of the container to be lifted. In such embodiments, a frame or arms of the lifting mechanism 39 may protrude horizontally from the body 33 of the bot 31, and the tethers 41 may be arranged at respective locations on the protruding frame/arms and configured to be raised and lowered from those locations to raise and lower a container into the container-receiving space adjacent to the body 33. The height at which the frame/arms is/are mounted on and protrude(s) from the body 33 of the bot 31 may be chosen to provide a desired effect. For example, it may be preferable for the frame/arms to protrude at a high level on the body 33 of the bot 31 to allow a larger container (or a plurality of containers) to be raised into the container-receiving space beneath the frame/arms. Alternatively, the frame/arms may be arranged to protrude lower down the body 33 (but still high enough to accommodate at least one container between the frame/arms and the track structure 13) to keep the centre of mass of the bot 31 lower when the bot 31 is loaded with a container.

To enable the bot 31 to move on the different wheels 35, 37 in the first and second directions, the bot 31 includes a wheel-positioning mechanism for selectively engaging either the first set of wheels 35 with the first set of tracks 17 or the second set of wheels 37 with the second set of tracks 19. The wheel-positioning mechanism is configured to raise and lower the first set of wheels 35 and/or the second set of wheels 37 relative to the body 33, thereby enabling the load handling device 31 to selectively move in either the first direction or the second direction across the tracks 17, 19 of the storage structure 1.

The wheel-positioning mechanism may include one or more linear actuators, rotary components or other means for raising and lowering at least one set of wheels 35, 37 relative to the body 33 of the bot 31 to bring the at least one set of wheels 35, 37 out of and into contact with the tracks 17, 19. In some examples, only one set of wheels is configured to be raised and lowered, and the act of lowering the one set of wheels may effectively lift the other set of wheels clear of the corresponding tracks while the act of raising the one set of wheels may effectively lower the other set of wheels into contact with the corresponding tracks. In other examples, both sets of wheels may be raised and lowered, advantageously meaning that the body 33 of the bot 31 stays substantially at the same height and therefore the weight of the body 33 and the components mounted thereon does not need to be lifted and lowered by the wheel-positioning mechanism.

Figure 6:
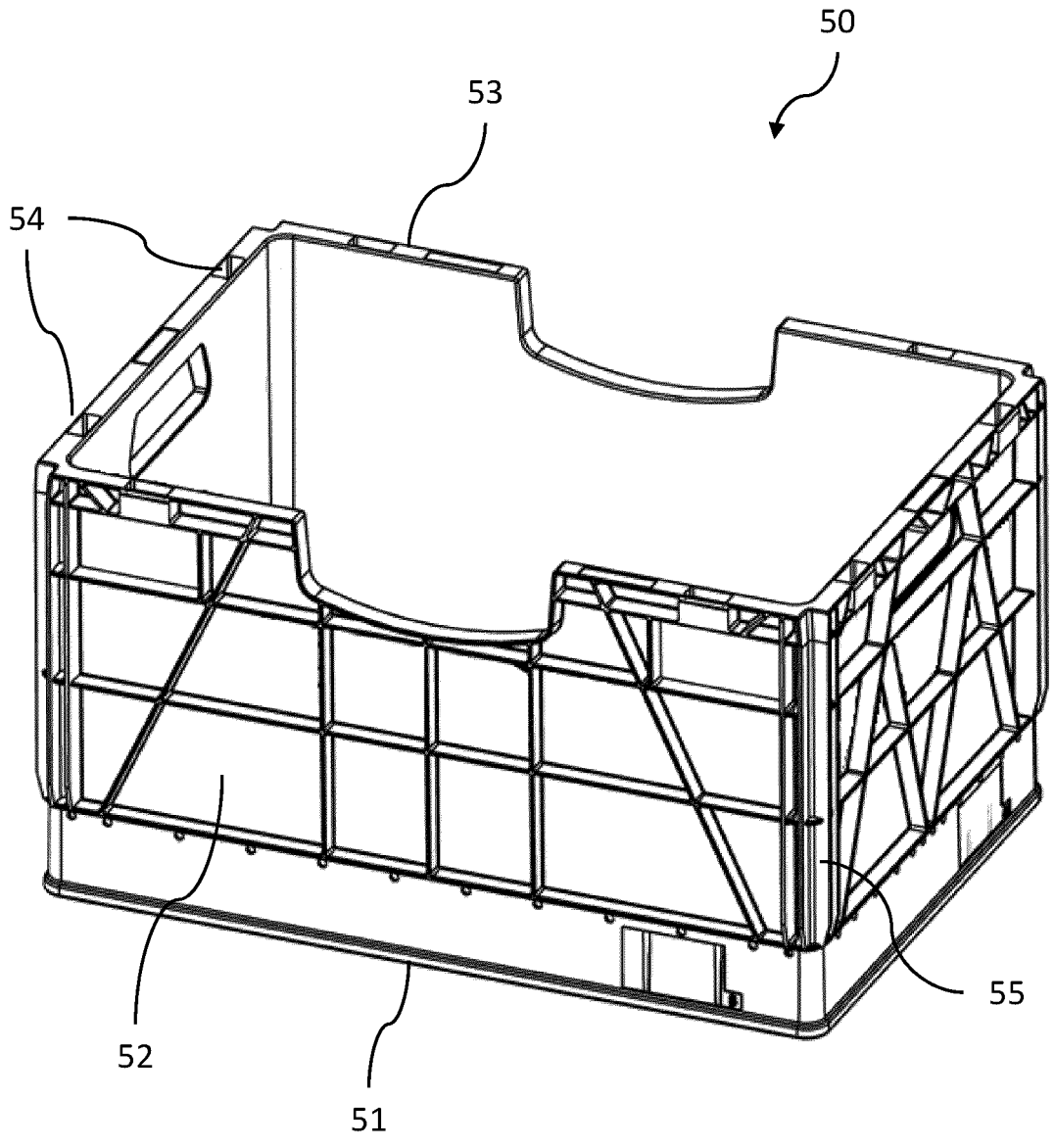
FIG. 6 is a schematic perspective view of a storage container.

FIG. 6 shows a perspective view of an example storage container 50 that can be gripped by the gripping device 43. The storage container 50 comprises a base 51 and four sidewalls 52 extending from the base 51 to form an open rectangular container, which can be used to store items such as grocery items. A rim 53 at the top of the container 50 forms the top surface of the container. The container 50 comprises engagement portions 54 for engaging with corresponding features of the gripping device for gripping the container. In particular, the container 50 comprises apertures or openings 54 defined in the rim 53 for receiving corresponding features of the gripping device. At each corner of the container 50, there is a cut-out or aperture 55 extending from the rim 53 towards the base 51 for engaging with further corresponding features of the gripping device for aligning the gripping device with the container 50.

In use, the storage container 50 may contain items that protrude above the top of the container (accidentally or otherwise). Such items can potentially obstruct the path of the gripping device 43 as the gripping device is lowered towards the top of the storage container. This can result in the gripping device 43 being unable to move close enough to the top of the container 50 for the gripping mechanism to successfully engage with the storage container, and/or can result in the gripping device becoming misaligned with the storage container so that the gripping mechanism fails to engage with the storage container or only partially or insecurely engages with the storage container.

Gripping devices that can be used with the load handling device 31 to mitigate this problem will now be described with reference to FIGS. 7 to 16.

Figure 7:
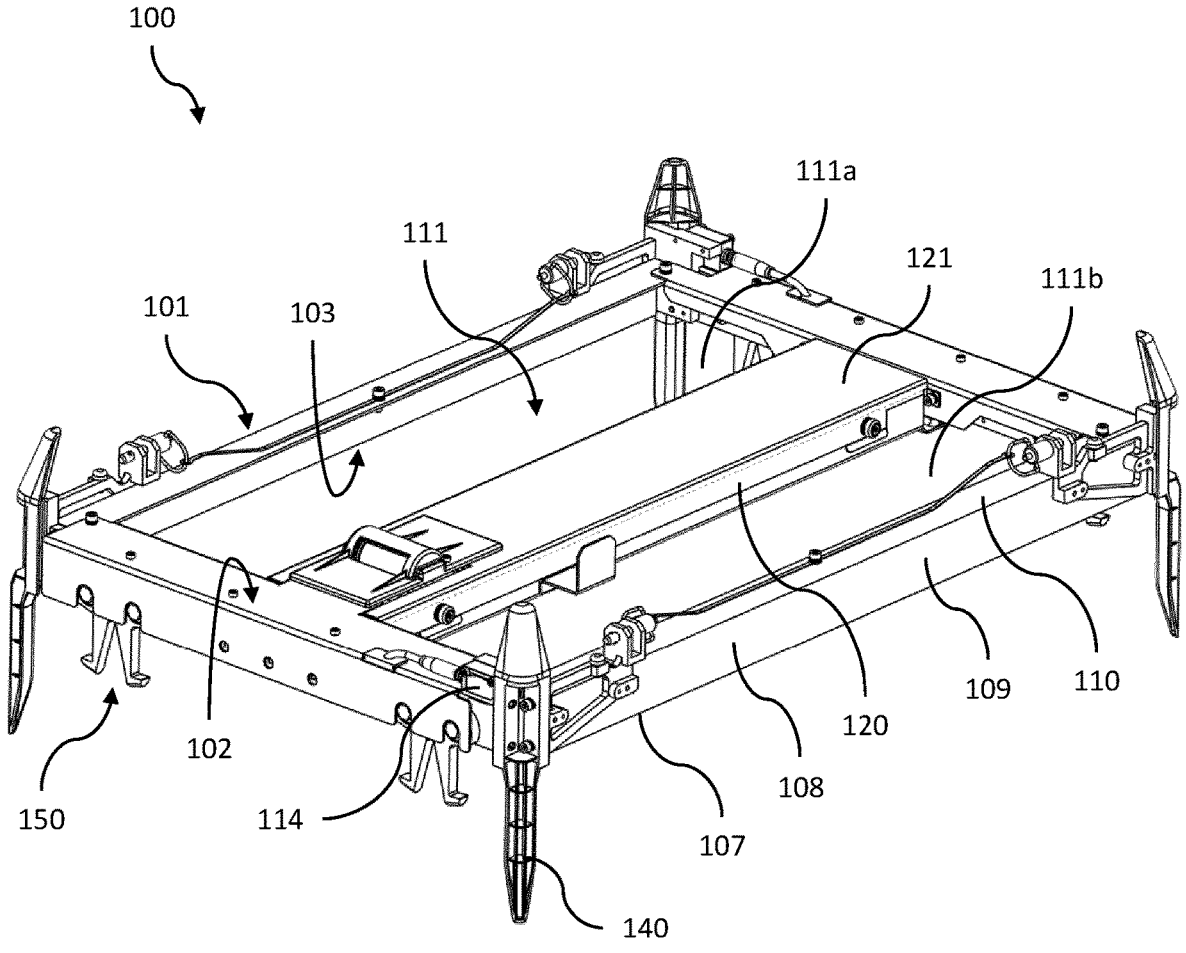
FIG. 7 is a perspective view of a gripping device.

As illustrated in FIG. 7, a gripping device 100 comprises a frame 101 having a generally planar shape, with a top side 102 and a bottom side 103. In use, the frame 101 is orientated such that a stack of storage containers is located below the frame 101.

Figure 8:
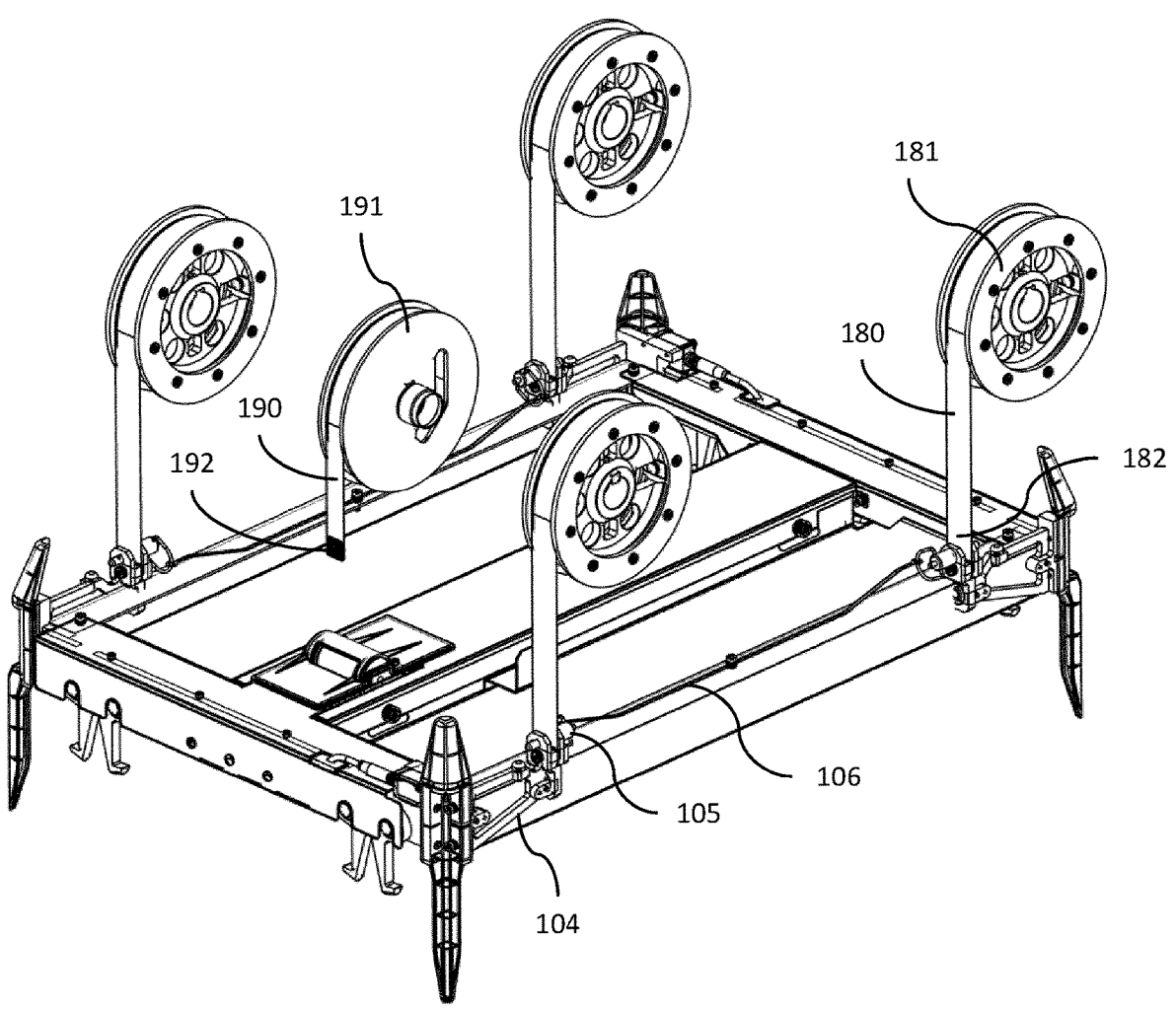
FIG. 8 is a perspective view of the gripping device of FIG. 7 attached to tethers.

As illustrated in FIG. 8, the frame 101 is connected to the lifting mechanism 39 by four reeled tethers 180 fixed nearby or at each of the corners of the frame 101 via brackets 104 mounted on the frame 101. Each tether 180 is in the form of a reeled or spooled tape 180, with a first end engaged with a reel or spool 181 located in the body of the bot 31, and a second, free end 182 extending downwards towards the frame 101 and fixed to a respective bracket 104. The tapes 180 are reeled and unreeled as the gripping device is raised and lowered respectively. For simplicity, the components for reeling and unreeling the tapes 180 are not shown in FIG. 8, but in general, any suitable motorised mechanism may be used for rotating the reels either together or individually.

The free end 182 of each tape 180 is releasably attached to a respective bracket 104 via a bolt or pin 105 inserted through an aperture extending through the free end 182 of the tape 180 and corresponding apertures in the bracket 104. The bolt 105 may be a quick-release bolt. For example, the bolt 105 may comprise radially extending protrusions that can retract under a spring-loaded mechanism for quick insertion and extraction. Alternatively, the apertures in the bracket 104 and at the free end 182 of the tape 180 may be keyed and the bolt 105 may be shaped to allow insertion of the bolt 105 through the apertures at one or more angular positions, but block extraction of the bolt 105 at other angular positions (i.e. the bolt 105 may be inserted then rotated to lock the bolt 105 in place). By using a quick-release bolt or other quick-release fixing means, the gripping device 100 may be quickly detached from the tapes 180 of the lifting mechanism 39, which allows for quicker, more efficient maintenance of the gripping device 100 or lifting mechanism 39. Each bolt 105 may be tethered to the frame 101 via a lanyard 106, which prevents the bolts 105 from becoming misplaced, and allows the user to readily locate the bolts 105 when re-attaching the tapes 180 to the gripping device 100. Other releasable fixing means (quick-release or otherwise) may be used to attach the free end 182 of each tape 180 to the frame 101, e.g. a clamp arrangement, a hook arrangement, a screw arrangement, a nut-and-bolt arrangement, etc.

Also shown in FIG. 8 is an electrical cable in the form of a flat flexible cable (FFC) 190 that comprises electrical conductors and may be used for transferring data and/or power between the bot 31 and the gripping device 100. In a similar way to the tethers 180, the FFC 190 is reeled onto a reel or spool 191 located in the body of the bot 31, with a first end engaged with the reel 191 and a second, free end 192 connected to the frame 101 (the FFC 190 is shown in an unconnected state in FIG. 8). The FFC 190 is reeled and unreeled as the gripping device 100 is raised and lowered respectively. The frame 101 is configured to receive the free end 192 of the FFC 190 for connection to other electrical and electronic components mounted on the frame 101, as will be described in further detail later.

The gripping device 100 further comprises a gripping mechanism 150 mounted on the frame 101 and configured to releasably grip a container from below the frame 101. Further details of the gripping mechanism 150 will also be described later.

As shown in FIG. 7, the frame 101 comprises four elongated frame members 107 joined together to form a substantially rectangular frame having a substantially downwardly extending peripheral wall 108 defining a substantially rectangular opening or cut-out 111 in the centre. The opening 111 extends completely through the top and bottom sides 103 of the frame 101.

The opening 111 through the frame 101 provides a headroom for any objects protruding above the top of the container when the gripping device 100 is being lowered towards the top of the container. In particular, when the gripping device 100 is being lowered towards the top of the container, any items protruding above the top of the container are likely to protrude through the opening 111 without obstructing the descent of the gripping device 100, rather than hitting a portion of the frame 101 and obstructing its descent.

Figure 9:
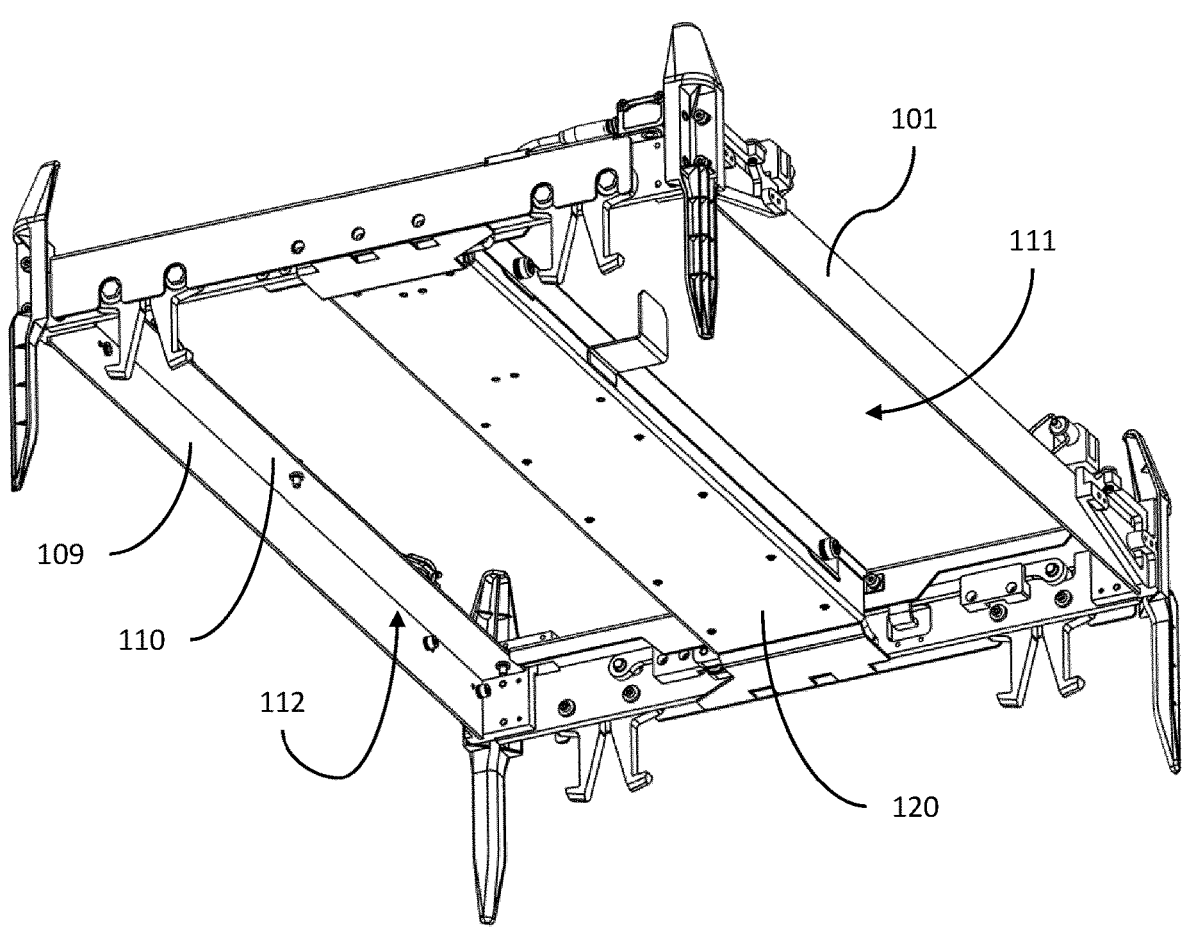
FIG. 9 is a perspective view of the gripping device of FIG. 7 from below.

In addition to extending substantially downwardly, the peripheral wall 108 may also extend substantially horizontally on the top side 102 of the frame 101. For example, as shown in FIG. 7 and FIG. 9 (which shows the underside of the frame 101), each frame member 107 may be formed as a bent metal plate having a substantially downwardly extending side portion 109 and a substantially horizontally extending top portion 110. Each frame member 107 may alternatively be described as having a substantially L-shaped profile with the base of the L-shape orientated towards the top side 102 of the frame 101. By extending both substantially downwardly and substantially horizontally on the top side 102 of the frame 101, the peripheral wall 108 may define a depression 112 in the bottom side 103 of the frame 101, with the opening 111 extending into the depression 112. The depression 112 provides more headroom in the frame 101 compared to a frame 101 where the bottom side 103 is not depressed, for example. The substantially horizontal portion 110 of the frame members 107 also provides a convenient surface for joining the frame members 107 together and/or mounting other components. However, it is not essential for the peripheral wall 108 to extend substantially horizontally on the top side 102 of the frame 101. Instead, the peripheral wall 108 may only extend substantially downwardly, or only a portion or portions of the peripheral wall 108 may extend substantially horizontally (e.g. some frame members 107 may have an L-shaped profile and some frame members 107 may have a flat profile).

The rectangular shape of the frame 101 is convenient for gripping rectangular storage containers. However, the frame 101 is not limited to being rectangular and may have other shapes, e.g. circular, triangular, other quadrilaterals, or other polygons, depending on the shape of the object to be gripped. The term "rectangular" used in this specification also includes a square. The shape of the frame 101 may be changed by changing the number and/or shape of the frame members 107, for example. The shape of the opening 111 is also not limited to being rectangular and may have other shapes, e.g. circular, triangular, other quadrilaterals, or other polygons. The shape of the opening 111 may be the same shape as the frame 101.

The frame 101 is also not limited to being formed from separate frame members joined together. Instead, the frame 101 may be formed as a unitary body, e.g. by metal stamping or die casting.

The frame 101 further comprises a bridge member extending across the frame 101 between two ends of the frame 101 (i.e. extending across the opening 111 between two opposing sides of the peripheral wall 108), thereby dividing the opening 111 into two smaller openings 111*a*, 111*b* on either side of the bridge member 120. However, the frame 101 may still be considered to have a single opening 111 that is partially occupied by the bridge member 120. The bridge member 120 preferably extends centrally across the frame 101 so that the frame 101 has an even weight distribution, which allows the frame 101 to be maintained in a horizontal orientation more easily when raised or lowered, which may simplify the control and/or configuration of the lifting mechanism 39. However, the bridge member 120 is not limited to extending centrally across the frame 101 and instead may be positioned closer to one lateral side of the frame 101 than another.

Figure 10:
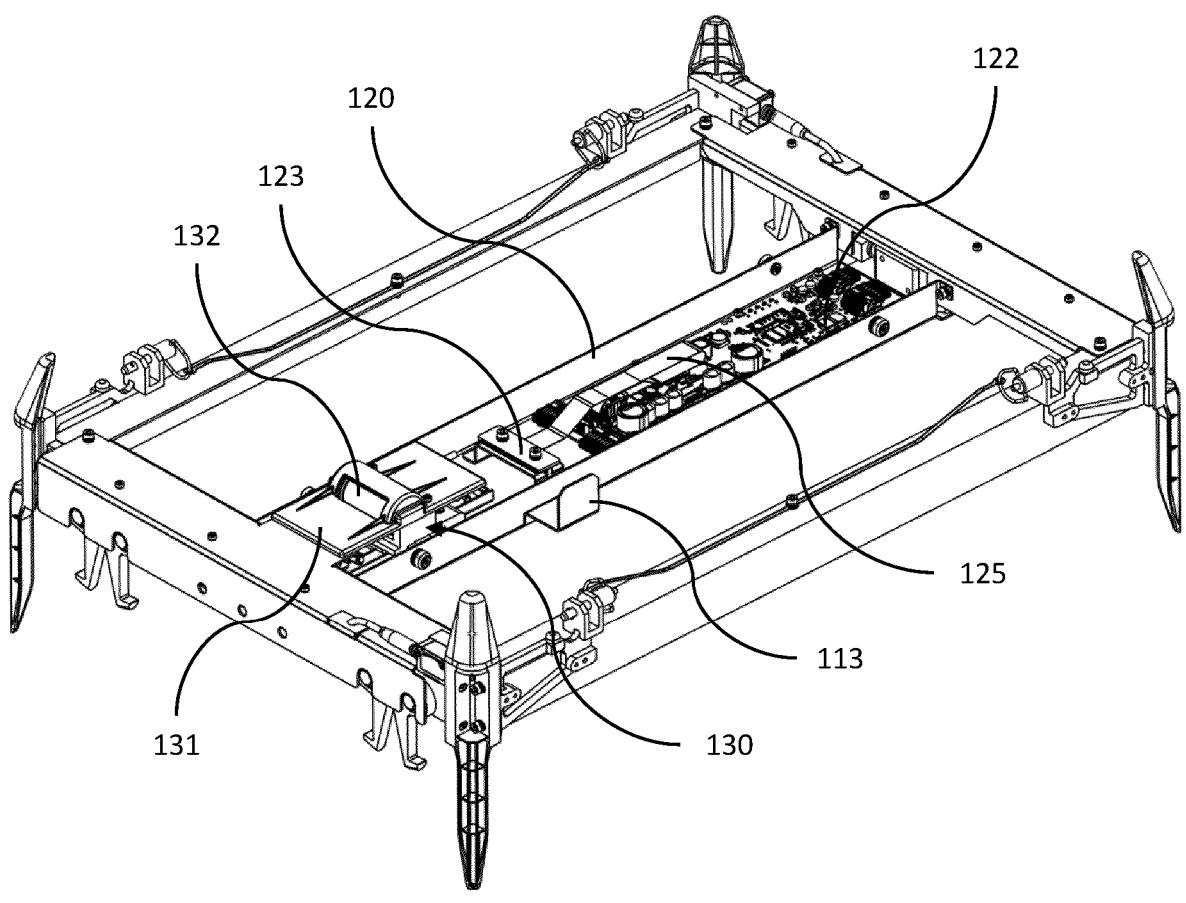
FIG. 10 is a perspective view of the gripping device of FIG. 7 with the cover of the bridge member removed.

The bridge member 120 may conveniently be used for routing or mounting electrical and/or electronic components for operating the gripping device 100. The electrical and/or electronic components may be mounted on an outer surface of the bridge member 120 or the electrical and/or electronic components may be mounted inside the bridge member 120 (i.e. the bridge member 120 may be hollow). FIG. 10 shows the gripping device 100 of FIG. 7 with the top cover 121 of the bridge member 120 removed. The bridge member 120 comprises a printed circuit board (PCB) 122 mounted inside the bridge member 120. The PCB 122 may comprise a processor or control module and circuitry which may be configured to, for example, supply power to the gripping mechanism 150, control the gripping mechanism 150, receive and process data from various sensors on the gripping device 100, and receive and send data and/or instructions to a processor or control module in the body of the bot 31. The electrical and/or electronic components may also include electrical cables or wires for transmitting power and/or data.

The bridge member 120 in FIG. 10 extends between the two ends of the frame 101 on which components of the gripping mechanism 150 are mounted. This provides convenient cable routing management for electrical cables to and from the gripping mechanism 150. However, this is not essential and the bridge member 120 may extend across the frame 101 between any two ends. The frame 101 may also comprise more than one bridge member, e.g. in a cross arrangement where two bridge members intersect, or in a parallel arrangement where the bridge members extend parallel to each other. Such bridge member arrangements will result in the frame opening 111 being split into more than two smaller openings.

The bottom of the bridge member 120 may also be recessed relative to the bottom of the peripheral wall 108. This provides additional headroom and helps to mitigate the loss of headroom due to the presence of the bridge member 120 in the opening 111.

In alternative embodiments of the gripping device 100, the bridge member 120 may be absent. In these embodiments, components (e.g. electrical and/or electronic and/or mechanical components) may be mounted to one side of the frame 101 (e.g. on the peripheral wall 108 itself, or a housing attached to the peripheral wall 108), rather than to a bridge member 120. Alternatively or additionally, some of the electrical and/or electronic components that were previously mounted in the bridge member 120 may be relocated to the body of the bot 31, rather than being located on the gripping device 100 itself in order to eliminate the use of a bridge member 120 and make more space available for an opening 111.

In other alternative embodiments, the peripheral wall 108 may define just a depression 112 in the bottom of the frame 101, with no opening extending through the frame 101. A frame with just a depression will still provide the advantage of providing some headroom for items protruding above the top of the container.

The frame 101 further comprises an upwardly extending bracket 113 mounted on the bridge member 120. The purpose of the bracket 113 is to trigger a sensor, e.g. an optical sensor, located in or on the bot 31 so that the bot 31 knows when the gripping device 100 has been fully raised and the bot 31 can move to its next destination on the grid structure. For example, the bot 31 may comprise a photo-interrupter sensor that detects when the upwardly extending portion of the bracket 113 interrupts a path between an optical transmitter and an optical receiver to detect when the gripping device 100 is in its fully raised position. The bracket 113 not limited to being mounted on the bridge member 120 and may be mounted elsewhere on the frame 101. The bracket 113 may also take any shape or form suitable for triggering a sensor, e.g. a photo-interrupter sensor. Other arrangements for detecting when the gripping device 100 is in a fully raised position are also possible, e.g. a mechanical contact sensor in the bot 31 that detects when a portion of the gripping device 100 has made contact with it.

As mentioned above, the bot 31 may comprise a reeled flat flexible cable (FFC) 190 (shown in FIG. 8) for transferring data/and power between the bot 31 and the gripping device 100. Referring to FIG. 10, the free end of the FFC 190 is received in the bridge member 120 via an aperture 124 (visible in FIG. 11) in the bridge member 120 and via a cable tensioner 130 which is configured to maintain the FFC 190 in tension (i.e. remove slack) as the gripping device 100 is raised or lowered by the lifting mechanism 39. The free end of the FFC 190 is then received in a clamp 123 inside the bridge member 120 and interfaces with the PCB 122 via another FFC 125. The clamp 123 is in the form of two plates which may be brought closer together or further apart by adjusting one or more screws. However, other clamp arrangements may be used, or other fixing devices commonly known in the art (e.g. screw, bolt, hook, etc.) may be used to reversibly fix the free end of the FFC 190 relative to the frame 101.

Figure 11:
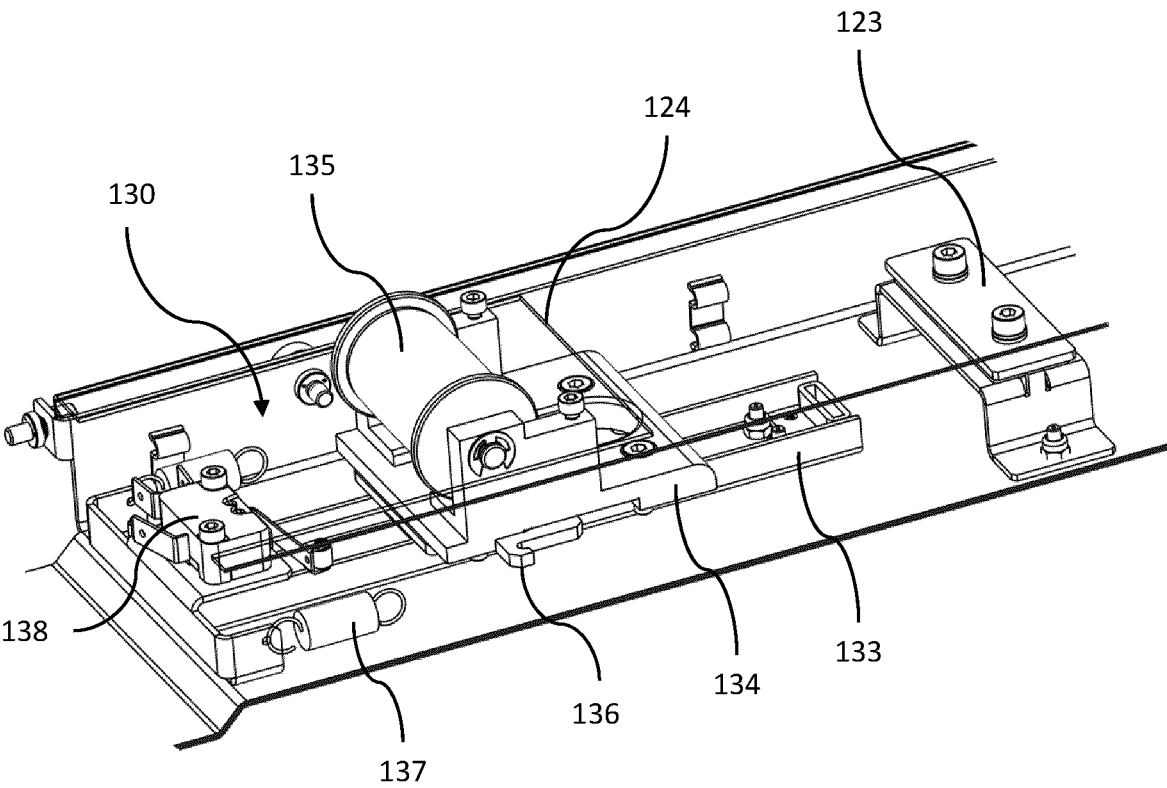
FIG. 11 is a perspective view of a cable tensioner from the gripping device of FIG. 7.

The cable tensioner 130 comprises a cover 131 which is located on top of the bridge member 120 and defines an aperture 132 which communicates with the aperture 124 in the bridge member 120 for receiving the FFC 190 into the bridge member 120. FIG. 11 illustrates a cutaway view of the bridge member 120 showing the components of the tensioner 130 with the cover 131 removed and with the bridge member cover 124 made transparent. As shown in FIG. 11, the tensioner 130 further comprises a carriage 134 that is slidably mounted on a linear track 133 and an idler roller 135 rotatably mounted on the carriage 134. When the FFC 190 is connected to the gripping device 100, the roller 135 engages the FFC 190 between the clamp 123 and the FFC reel 191. In particular, the FFC 190 is received substantially vertically through the aperture 132 in the tensioner cover 131 into the bridge member 120, where it then changes direction by substantially 90 degrees via contact with the idler roller 135 so that it extends substantially horizontally between the tensioner 130 and the clamp 123.

The tensioner 130 further comprises a biasing device in the form of two tension springs 137 coupled to the carriage 134 so as to bias the carriage 134 towards one end of the track 133 in a direction away from the clamp 123 (FIG. 11 shows the springs 137 and the carriage 134 in an uncoupled state). In the example shown in FIG. 11, the carriage 134 comprises hooks 136 which engage with hooks or rings on one end of the springs 137; however, any suitable engagement between the springs 137 and the carriage 134 may be used. In use, the springs 137 bias the carriage 134 along the track 133 such that the roller 135 is pulled against the FFC 190, which helps to maintain tension in the FFC 190 as the FFC 190 is reeled and unreeled during raising and lowering of the gripping device 100. The strength (i.e. the spring constant) of the springs 137 may be chosen so that the appropriate tension is applied to the FFC 190 throughout the range of movement of the gripping device 100.

The cable tensioner 130 further comprises a micro switch 138 (also known as a microswitch, or a snap-action switch) mounted at the end of the track 133 towards which the carriage is biased. The micro switch 138 is for detecting when there is complete slack in the FFC 190, e.g. when a part of the gripping device 100 and/or lifting mechanism 39 has failed in some way. In particular, during normal operation, the FFC 190 will normally be spaced away from the micro switch 138, due to the FFC 190 pulling against the biasing force of the springs 137. However, in one or more failure modes, the FFC 190 may go completely slack, resulting in the springs 137 pulling the carriage 134 fully back to a stop position and causing the carriage 134 to trip the micro switch 138, which sends a signal to a processor that may be used to stop or halt operation of the gripping device 100. Instead of a micro switch 138, other ways of detecting when the carriage 134 has reached the stop position may be used, e.g. other types of mechanical contact sensor, non-contact sensors such as an optical sensor, etc.

The aperture 124 in the bridge member 120 for receiving the FFC 190 is sized to accommodate the sliding movement of the carriage 134 (particularly if some components such as the idler roller 135 protrude above the height of the bridge member 120, as shown in FIG. 11). The cover 131 of the tensioner 130 is rigidly mounted to the carriage 134 such that it moves with the carriage 134 relative to the bridge member 120 as the carriage 134 slides back and forth along the track 133. The cover 131 is sized such that the cover 131 always covers the aperture 124 in the bridge member 120 regardless of the position of the carriage 134. The aperture 132 in the cover is smaller than the aperture 124 in the bridge member 120. The cover 131 helps to stop any unwanted objects entering the bridge member 120, which may interfere with the operation of the tensioner 120.

Although the biasing device of the cable tensioner 130 shown in FIG. 11 comprises two tension springs 137, alternative arrangements may be used to bias the idler roller 135 against the FFC 190. For example, a different number of springs may be used (e.g. one spring or more than two springs), or a different type of spring may be used, e.g. a compression spring configured to push (instead of pull) the idler roller 135 against the FFC 190.

Although the cable tensioner 130 shown in FIG. 11 is arranged to tension an FFC 190 that transfers power and/or data, the cable tensioner 130 can be used with other types of cable, e.g. non-flat cables or non-electrical cables. The cable tensioner 130 also does not need to be located in or on the bridge member 120 and may instead be located anywhere on the frame 101.

The cable tensioner 130 is particularly useful in arrangements where the FFC reel 191 or other cable reel is not rotated by an individual motor (which would be able to control the tension in the cable by adjusting the speed of rotation). For example, the FFC reel 191 may be mounted with other reels (e.g. tether reels 181) on the same shaft driven by a single motor and each cable may reel and unreel at different speeds. Thus, the cable tensioner allows for arrangements where multiple cable reels do not need their own individual motor, while still allowing each cable to be held under tension as the gripping device is raised and lowered.

The gripping mechanism 150 of the gripping device 100 will now be described with reference to FIGS. 12 and 13.

The gripping mechanism 150 comprises a gripping assembly 151 mounted on the downwardly extending portion of the peripheral wall 108 at one end of the frame 101. An identical gripping assembly 151 is mounted on the peripheral wall 108 at an opposing end of the frame 101. Each gripping assembly 151 comprises two grippers 152 spaced apart along a portion of the peripheral wall 108. When the frame 101 is in its assembled state, each gripper 152 is located adjacent to or near a respective corner of the frame 101. Each gripper 152 comprises a pair of legs 153 pivotally mounted to the peripheral wall 108 so as to be movable away from each other to define an open configuration and toward each other to define a closed configuration. FIG. 12(*a*) shows a perspective view of the gripping assembly 151 in the open configuration and FIG. 12(*b*) shows a perspective view of the gripping assembly 151 in the closed configuration.

The legs 153 of each gripper 152 extend below the frame 101 (i.e. below the peripheral wall 108). Each leg 153 comprises a foot 154 located below the frame 101. The feet 154 of the legs 153 in each pair extend or point outwards in opposite directions. When the legs 153 are in the closed configuration, the feet 154 are adjacent to each other and are receivable in a corresponding aperture 54 in the rim 53 of the container 50. However, when the legs 153 are in the open configuration, the feet 154 are spaced apart to a distance that is greater than the size of the aperture 54. Thus, once the feet 154 (in the closed configuration) are received in an aperture 54 in the rim 53 of the container 50, moving the legs 153 from the closed to the open configuration will engage the feet 154 with the rim 53 of the container 50 and allow the storage container to be lifted by the gripping device 100. In particular, each foot 154 has an upward-facing surface 155 that is configured to engage with a downward-facing surface on the rim 53 of the storage container 50. To release the container 50, the legs 153 are moved from the open configuration to the closed configuration, which disengages the feet 154 from the rim 53 of the container and allows the feet 154 to be removed from the apertures 54 in the rim 53 of the container 50.

The legs in each pair of legs 153 are engaged with each other such that pivotal rotation of one of the legs 153 in one direction causes pivotal rotation of the other leg 153 in the opposite direction. Thus, the pair of legs 153 can be driven between the open and closed positions by driving only one of the legs 153 in each pair. The engagement between the legs 153 may be a meshed engagement. For example, as shown in FIG. 12, the legs 153 comprise teeth 156 that interlock with each other to form a toothed gear arrangement. This includes an arrangement where one leg 153 in the pair has only one tooth and the other leg 153 in the pair has a corresponding recess for receiving the tooth. Other engagements for transmitting rotational motion between the legs 153 in each pair are also possible, e.g. a cam arrangement, or a friction gear arrangement.

Figure 12:
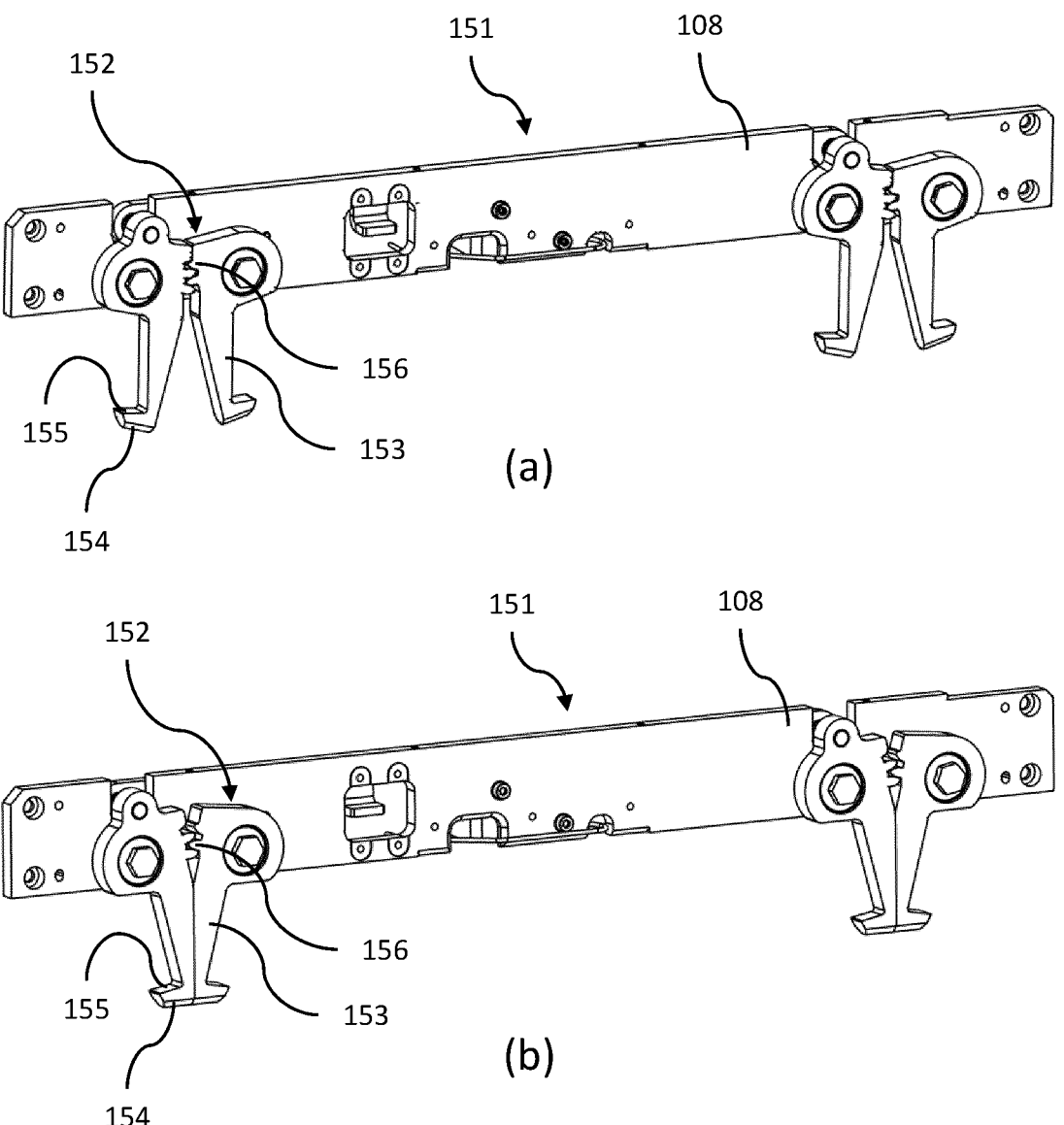
FIG. 12 shows perspective views of a gripping assembly from the gripping device of FIG. 7 when the grippers are in (a) an open configuration; and (b) a closed configuration.
Figure 13:
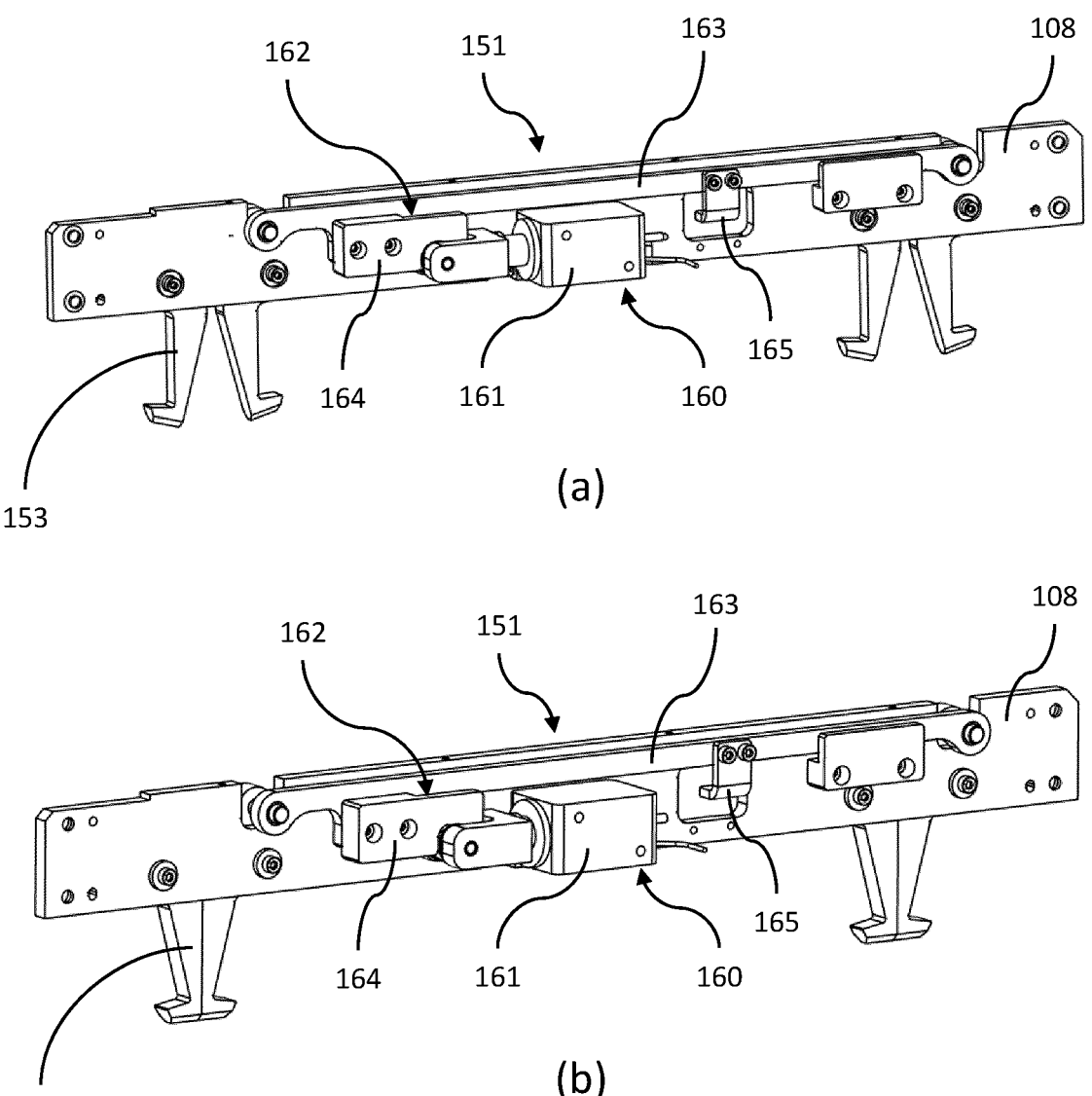
FIG. 13 shows the gripping assembly of FIG. 12 viewed from the reverse side.

FIG. 13 shows the reverse side of the gripping assembly of FIG. 12. As shown in FIG. 13, each gripping assembly 151 further comprises an actuation mechanism 160 for driving the grippers 152 between the open and closed configurations. FIG. 13(*a*) shows the position of the components of the actuation mechanism 160 when the grippers 152 are in the open configuration and FIG. 13(*b*) shows the position of the components of the actuation mechanism 160 when the grippers 152 are in the closed configuration.

The actuation mechanism 160 comprises a single linear actuator 161 for driving each gripper 152 between the open and closed configurations. The linear actuator 161 creates motion in a straight line and may be any suitable type of linear actuator 161, e.g. an electro-mechanical actuator or a linear solenoid actuator (e.g. a bi-stable linear solenoid actuator).

A linkage assembly 162 couples the linear actuator 161 to each gripper 152 such that actuation of the linear actuator 161 drives each gripper 152 substantially simultaneously between the open and closed configurations. In particular, the linkage assembly 162 comprises a linkage arm 163 that is engaged with one leg in each pair of legs 153 such that linear movement of the linkage arm 163 by the linear actuator 161 causes pivotal rotation of the legs 153 that are engaged with the linkage arm 163. However, because the legs 153 in each pair are engaged with each other (as described above), actuation of only one of the legs 153 in each pair by the linkage arm 163 will cause both legs 153 in each pair to pivotally rotate, thereby moving the grippers 152 between the open and closed configurations substantially simultaneously.

The linkage assembly 162 shown in FIG. 13 further comprises an intermediate linkage member 164 rigidly coupling the linear actuator 161 to the linkage arm 163. However, the linkage assembly 162 may alternatively be formed as a single linkage member directly coupling the linear actuator 161 to each gripper 152.

The linkage assembly 162 further comprises a flag member 165 which is rigidly attached to the linkage arm 163. Thus, the flag member moves linearly with the linkage arm 163 between an open flag position corresponding to the open configuration of the grippers 152 and a closed flag position corresponding to the closed configuration of the grippers 152. The linkage assembly further comprises a sensor for detecting which position the flag member 165 is in to allow a controller on the gripping device and/or the bot 31 to determine whether the grippers 152 are in the open or closed configuration. The sensor may be any suitable known type of sensor, e.g. a photo-interrupter sensor in which a laser or optical beam is interrupted by the flag member 165 when the flag member 165 moves from the open flag position to the closed flag position or vice versa. In alternative embodiments, the flag member 165 may be located elsewhere on the linkage assembly 162, or elsewhere on the gripping assembly 151. For example, the flag member 163 may be rigidly fixed to one of the legs 153 of one or more grippers 152 such that the flag member 163 rotates with the leg 153 between the open flag position and the closed flag position.

The linear actuator 161 is arranged such that it actuates in a direction parallel to the vertical plane in which the grippers 152 lie (i.e. parallel to the portion of the peripheral wall 108 on which the grippers 152 are mounted). The linear actuator 161 comprises a body having a longitudinal axis and the body is arranged with the longitudinal axis aligned parallel to the actuation direction of the linear actuator. In this way, the longitudinal body of the linear actuator 161, the linkage assembly 162 and the grippers 152 can all be aligned in the same direction and therefore the linear actuator 161, the linkage assembly 162 and the grippers 152 can be mounted on the peripheral wall 108 in a compact arrangement. Alternatively, the linear actuator 161 may be mounted on another portion of the frame 101 adjacent to the grippers 152. Furthermore, only a single linear actuator 161 is required to drive multiple grippers 152, which further reduces the size of the gripping assembly 151.

Although FIGS. 12 and 13 show a gripping assembly 151 having two grippers 152, the gripping assembly 151 is not limited to two grippers 152 and may have more than two grippers 152, depending on the size of the frame 101 and the object to be gripped. For gripping assemblies with more than two grippers 152, the linkage assembly may couple the linear actuator 161 to all of the grippers 152 so that actuation of a single linear actuator 161 drives all of the grippers 152 between the open and closed positions substantially simultaneously. Alternatively, an individual gripping assembly 151 may comprise more than one linear actuator 161, each linear actuator being configured to drive a corresponding group of two or more grippers 152 between their open and closed positions substantially simultaneously via respective linkage assemblies.

The linear actuator 161 may be controlled by a controller mounted on the frame 101 (e.g. in the bridge member 120) or in the body of the bot 31. Power to the linear actuator 161 may originate from the power supply (e.g. a battery) of the bot 31 and be supplied via the FFC 190 or other electrical cable.

The linear actuation mechanism 160 of the gripping assemblies 151 also has a synergistic effect with the opening 111 in the frame 101. In particular, as described above, the linear actuation mechanism 160 allows for a gripping assembly 151 that can be compactly mounted on or closely adjacent to the peripheral wall 108, which makes more space available toward the centre of the frame 101 for the opening 111. However, the gripping mechanism 150 can also be used with other forms of gripping devices, e.g. gripping devices that do not have an opening through the top and bottom sides. Conversely, the gripping device 100 (with an opening through the top and bottom sides) does not require all aspects of the gripping mechanism 150 described above. For example, each gripper 152 may be driven by its own individual actuator, which may be a linear or rotational actuator.

Although the gripping device 100 of FIG. 7 has two gripping assemblies 151 mounted on opposing ends of the frame 101, the frame 101 may comprise only one gripping assembly 151, or more than two gripping assemblies 151, depending on the shape of the frame 101 and the object to be gripped. The gripping assemblies 151 also do not need to be provided on opposing ends of the frame 101 and may be provided at any position on the frame 101 that allows the gripping device 100 to stably grip and lift the object to be gripped.

Furthermore, the grippers 152 do not necessarily need to be engageable with the storage container 50 in the open configuration. Instead, the grippers 152 and/or storage container 50 may be configured such that the grippers engage with the storage container 50 when in the closed configuration. For example, the grippers 152 may be configured to provide a claw or pincer grip (e.g. by reversing the orientation of the feet 154 such that the point inwards) and may engage the storage container 50 by gripping around a corresponding portion of the storage container 50. In general, the grippers 152 are moveable between a gripping position for gripping the container 50 and a release position for releasing the container 50. The open configuration of the grippers 152 may correspond to either the gripping position or the release position and the closed configuration may correspond to the other of the gripping position and the release position.

Figure 14:
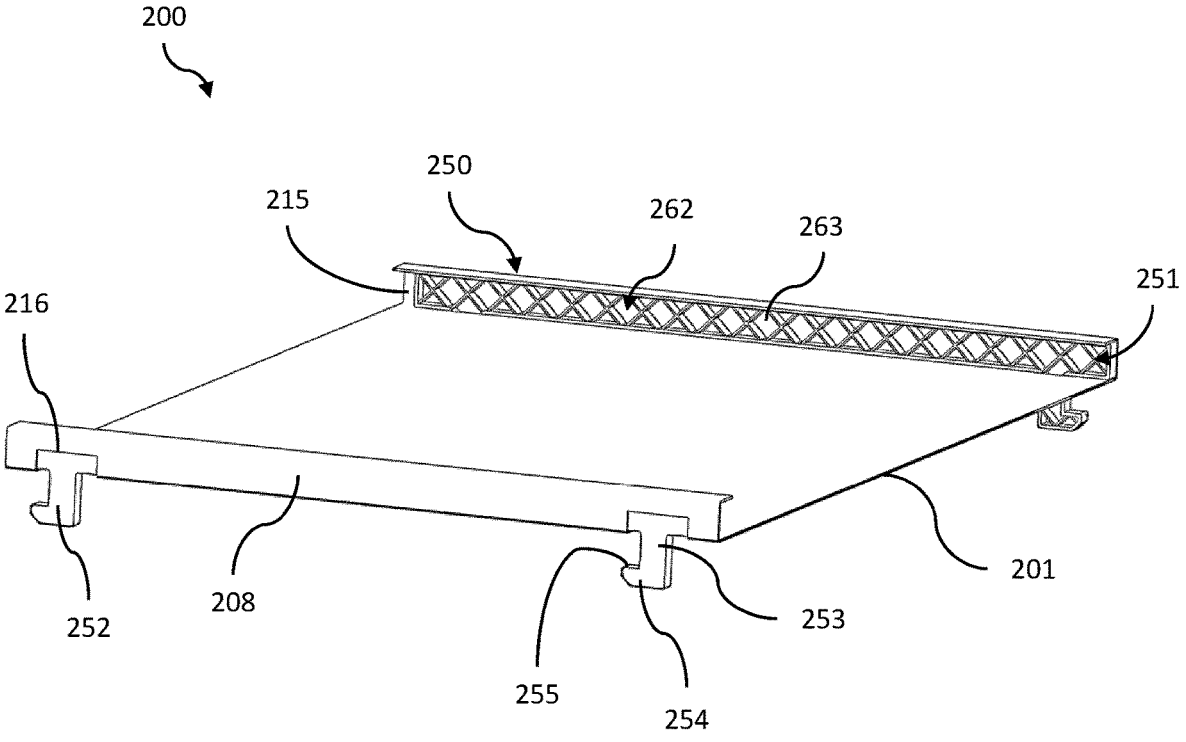
FIG. 14 shows a gripping device having an alternative gripping mechanism.

FIG. 14 shows a schematic drawing of a gripping device 200 having an alternative gripping mechanism 250. Similar to the gripping mechanism 150 described above, the alternative gripping mechanism 250 comprises two gripping assemblies 251 mounted at opposing ends of a frame 201.

Each gripping assembly 251 comprises two grippers 252 spaced apart along a portion of a peripheral wall 208. In contrast to the grippers 152 of gripping assembly 151, each gripper 252 has only a single leg 253 that extends below the frame and comprises a foot 254 located below the frame. Each leg 253 is linearly movable relative to the frame 201 in a horizontal direction (i.e. in a direction orthogonal to the top/up and bottom/down directions) between a gripping position and a release position. Each leg 253 may be slidably mounted to the frame.

Each gripping assembly 251 further comprises a single linear actuator (not shown) configured to drive the two grippers 252 between the gripping position and the release position. The gripping assembly 251 further comprises a linkage assembly 262 coupling the linear actuator to each gripper 252 so that actuation of the linear actuator drives the grippers 252 substantially simultaneously between the gripping position and the release position. The linear actuator may be any suitable type of linear actuator, e.g. an electromechanical actuator or a linear solenoid actuator (e.g. a bi-stable linear solenoid actuator).

The linkage assembly 262 comprises a linkage arm 263 that is engaged with the leg 253 of each gripper 252. In the gripping mechanism 250 shown in FIG. 14, the linkage arm 263 is integrally formed with each gripper 252, which reduces and simplifies the components of the gripping mechanism 250, allows for the use of cheaper fabrication techniques such as plastic injection moulding or 3D printing and simplifies assembly of the gripping mechanism. However, the linkage assembly 250 may also be formed as a separate component to the grippers 252.

In use, the foot 254 of each leg 253 may be received in a respective aperture 54 in the rim 53 of the container 50 when the legs 253 are in the release position. Once the feet 254 are received in the apertures, moving the legs 253 from the release position to the gripping position moves the feet 254 under the rim 53 such that an upward-facing surface 255 of each foot 254 engages with a downward-facing surface of the rim 53 of the container 50, thereby allowing the container 50 to be lifted.

As mentioned above, the gripping device 200 comprises two gripping assemblies 251 at opposing ends of the frame 201. As shown in FIG. 14, the feet 254 of one of the gripping assemblies 251 point in the opposite direction to the feet 254 of the other gripping assembly 251. Furthermore, the grippers 252 of one of the gripping assemblies 251 are moved in an opposite direction to the grippers 252 of the other gripping assembly 251 when moving between the gripping and release positions. In this way, the container 50 may be gripped more securely compared to an arrangement where the feet 254 of both gripping assemblies 251 pointed and moved in the same direction. However, this is not essential and the feet of both gripping assemblies 251 may point and move in the same direction.

Instead of the linear actuator driving the grippers 252 of the gripping assembly 251 from the gripping position to the release position, and from the release position to the gripping position, the grippers 252 may optionally be resiliently biased towards the gripping position, e.g. using a spring (not shown). In such an arrangement, the linear actuator is then only required to drive the grippers 252 in one direction against the resilient bias to move the grippers 252 to the release position. When the grippers 252 need to return to the gripping position, the actuator does not need to perform any work and can just allow the grippers 252 to move to the gripping position under the resilient bias (the actuator may be backdrivable). Alternatively, the grippers 252 may be resiliently biased towards the release position and the actuator may be configured to drive the grippers 252 against the resilient bias to move the grippers 252 to the gripping position. By resiliently biasing the grippers 252 towards either the gripping position or the release position and requiring the linear actuator to drive the grippers 252 in only one direction, less energy may be required by the linear actuator during operation, which would reduce operation costs and help to extend the battery life of a battery powered bot 31.

Similar to the gripping mechanism 150, the gripping mechanism 250 also allows for a compact arrangement where the body of the linear actuator can be aligned with and mounted adjacent to the grippers 252. The gripping mechanism 250 is also not limited to having two gripping assemblies 251, each having two grippers 252. Similar to the gripping mechanism 150, the gripping mechanism 250 can have a different number of gripping assemblies arranged anywhere on the frame and the gripping assemblies may have a different number of grippers 252 depending on the size and shape of the frame and the object to the gripped.

The frame 201 as illustrated in FIG. 14 comprises a sheet of material, e.g. metal, with upturned sides that form a substantially upwardly extending peripheral wall 208. The peripheral wall 208 further extends substantially horizontally on the top side to form channels 215 for receiving the integrally formed grippers 252 and linkage arm 263 of the gripping assemblies. The frame 201 defines apertures or slots 216 in the channels 215 through which the grippers 252 are received so that the grippers 252 extend below the frame 201. The slots 216 are sized to allow linear movement of the grippers 252 between the gripping and release positions. Frame 201 may be advantageous in that it can be cheaply formed from a single sheet of material.

Alternatively, the frame 201 may be formed as a sheet of material with downturned sides that form a substantially downwardly extending peripheral wall 208. Such a frame would define a depression in the bottom side of the gripping device. The peripheral wall 208 may further extend substantially horizontally on the bottom side to form channels 215 for receiving the gripping assemblies 251. The apertures or slots 216 for receiving the grippers 252 may be relocated so that the grippers 252 extend below the frame 201.

The gripping assemblies 251 do not necessarily need to be received in channels 215 and may be mounted on the frame 201 in other suitable ways that allow for linear movement, e.g. a cam on the linkage arm 263 and a linear cam track defined in the peripheral wall 208.

Although the frame 201 illustrated in FIG. 14 does not have an opening, the frame 201 may define an opening extending through the top and bottom sides similar to the opening 111 of frame 101. The frame 201 may comprise any other features of frame 101, e.g. guide members 140, sensors 114, cable tensioner 130, etc. The gripping mechanism 250 may also be used with the frame 101 shown in FIG. 7 by mounting the gripping assemblies on the frame members 107, for example.

The gripping mechanism 250 may be advantageous over the gripping mechanism 150 in that it requires less components, the fabrication of the components may be cheaper, the movement of the grippers 252 is simpler with less wear-and-tear of the components and assembly of the gripping mechanism is simpler.

Although the gripping mechanism 250 has been described above with a linear actuator, a rotary actuator (e.g. an electric motor) may be used with the gripping mechanism 250 instead, and the linkage assembly 262 may be configured to convert rotational motion from the rotary actuator to linear motion to drive the linear movement of the grippers 252.

Referring back to FIG. 7, the gripping device 100 further comprises guide members 140 mounted at each corner of the frame 101. Each guide member 140 has an elongated shape extending below the peripheral wall 108 and extending further below the peripheral wall 108 than the gripping mechanism 150, in particular the grippers 152 of the gripping mechanism 150. The guide members 140 are configured to mate or engage with the cut-outs or openings 55 in the corners of the storage container 50 to help align the frame 101 over the top of the container 50 as the gripping device 100 is lowered so that the grippers 152 are in the correct position to be received in the openings 54 in the rim 53 of the container 50.

Although the gripping device 100 of FIG. 7 has four guide members 140 (one at each corner of the rectangular frame 101), the gripping device 100 may comprise a different number of guide members 140 (i.e. at least one guide member) depending on the shape of the frame and the object to be gripped. The guide members 140 are also not limited to being mounted at the corners of the frame 101 and may instead be mounted at any position on the frame 101, e.g. at the edges.

The gripping device 100 further comprises one or more sensors 114 mounted on the peripheral wall 108 for determining when the gripping device 100 has reached a predetermined height above the rim 53 of the storage container 50 as it is being lowered. The predetermined height corresponds to a position where the grippers 152 of the gripping device 100 have been received in the apertures 54 in the rim 53 of the container 50 and where driving the grippers 152 to the open configuration will engage the grippers 152 with the underside of the rim 53. In the gripping device 100 of FIG. 7, a sensor 114 is mounted at the ends of the frame on which the gripping assemblies 151 are mounted, thereby allowing the gripping device 100 or bot 31 to determine whether each individual gripping assembly 151 is in the correct engagement position relative to the container 50. The sensors 114 may be distance sensors that use light or ultrasonic waves, for example, to determine the distance between the frame 101 and the rim 53 of the container 50. Alternatively, the sensors 114 may be mechanical contact sensors, e.g. positioned below the frame 101 and configured to contact the rim of the container and trigger once the frame 101 has reached the predetermined height above the rim 53.

Figure 15:
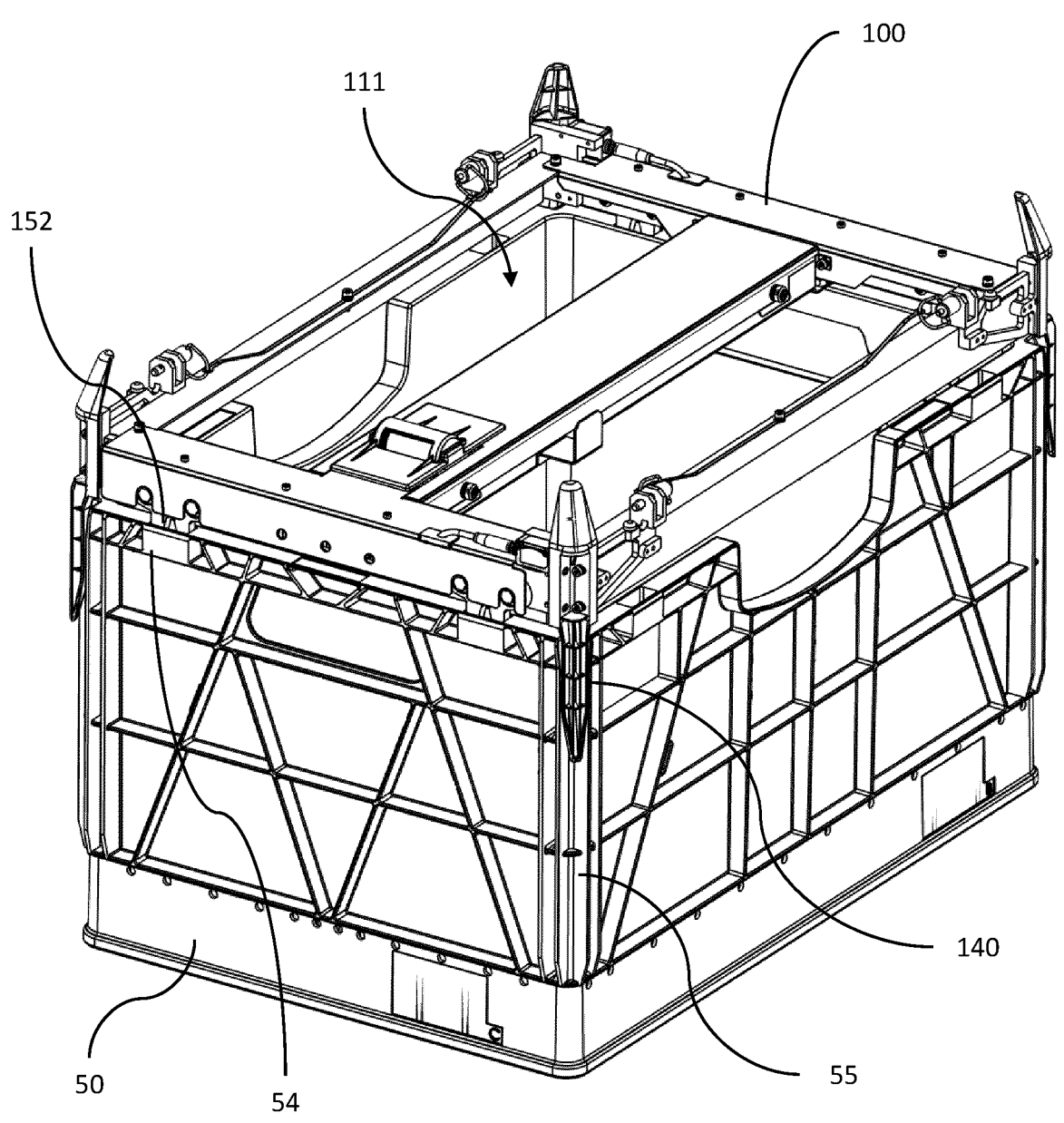
FIG. 15 is a perspective view of the storage container of FIG. 6 being gripped by the gripping device of FIG. 7.
Figure 16:
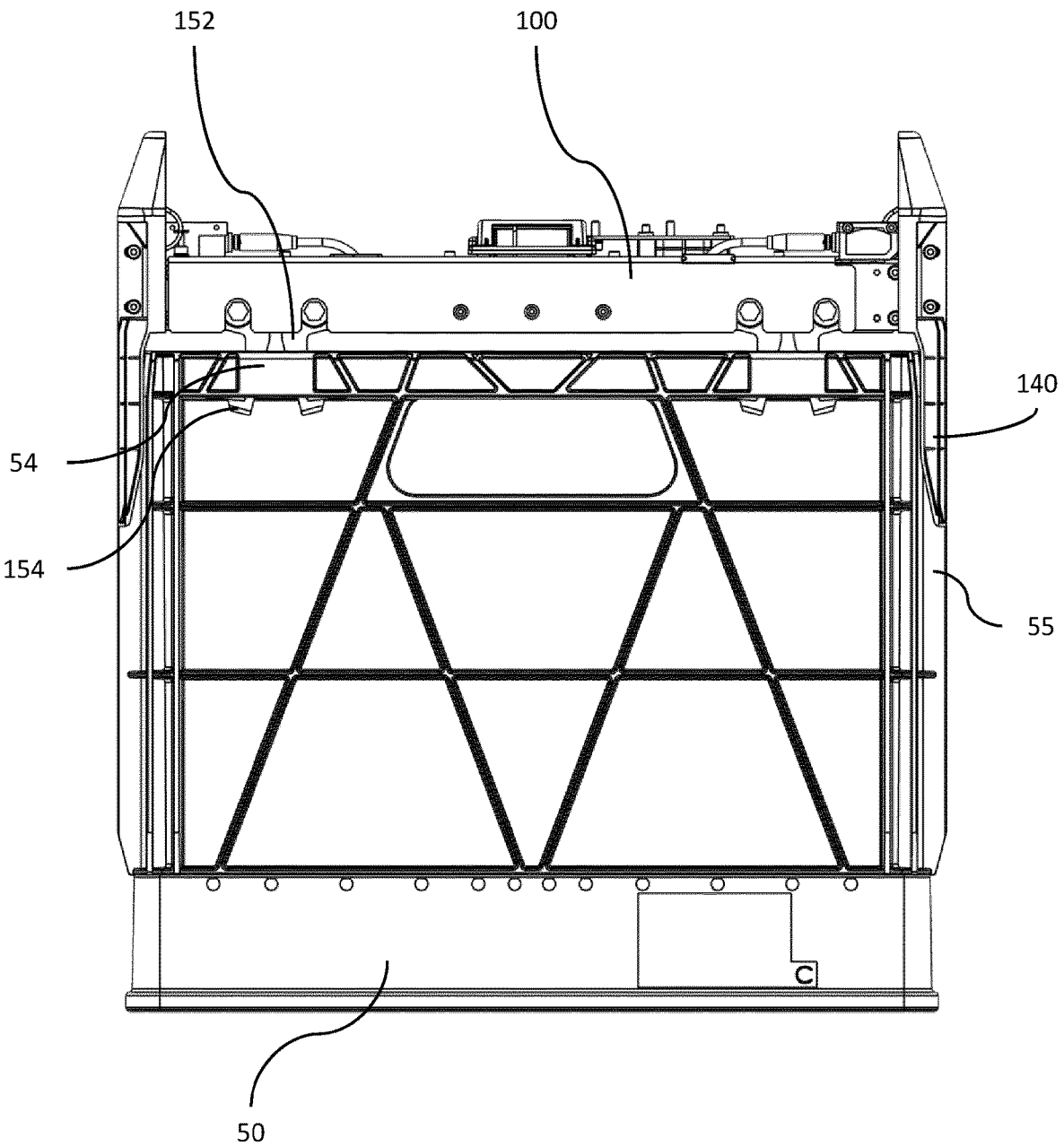
FIG. 16 is an end view of FIG. 15.

FIG. 15 and FIG. 16 show a perspective view and an end view of the gripping device 100 engaged with a storage container. As can be seen in FIGS. 15 and 16, the grippers 152 have been received in the apertures 54 in the rim 53 of the container 50 and are in their open configuration so that the feet 154 of the grippers 152 are engaged with the underside of the rim 53 of the container 50 and the container 50 can now be lifted.

It can be seen in FIG. 15 that the opening 111 in the frame 101 provides a headroom above the storage container 50 for any items protruding above the top of the container 50 when the frame 101 is being lowered towards or engaged with the container. In particular, when the frame 101 is being lowered towards the storage container 50, any items protruding above the top of the container that would normally obstruct the descent of the gripping device 100 are likely to protrude into or through the depression 112 or opening 111 instead.

The openings in the frame 101 also provide the added benefit of reducing the weight of the frame 101 compared to a solid frame with no openings, which means that less energy is required to raise and lower the gripping device 100, thereby increasing the uptime of battery-powered bots and reducing the cost of operation.

The invention claimed is:

1. A gripping device for being suspended from a load handling device for lifting and moving containers stacked in stacks in a grid storage structure having a plurality of tracks arranged in a grid pattern above the stacks of containers, the gripping device comprising:
   a frame;
   a gripping mechanism mounted on the frame configured to releasably grip a container from below the frame;
   a fixing device mounted on the frame configured to fix a free end of a reeled cable; and
   a cable tensioner configured to put the cable under tension when in use, the cable tensioner including:
   a track mounted on the frame;
   a carriage slidably mounted on the track and configured to engage the cable in use; and
   a biasing device configured to bias the carriage towards one end of the track in a direction away from the fixing device so as to put the cable under tension when the carriage is engaged with the cable in use.

2. The gripping device of claim 1, wherein the biasing device comprises:
   a spring.

3. The gripping device of claim 2, wherein the spring is a tension spring or a compression spring.

4. The gripping device of claim 2, wherein one end of the spring is coupled to the carriage and another end of the spring is fixed relative to the frame.

5. The gripping device of claim 1, wherein the cable tensioner comprises:
   a roller mounted on the carriage configured to engage with the cable when in use.

6. The gripping device of claim 1, wherein the carriage is configured to be movable along the track to a stop position under the bias of the biasing device, and the cable tensioner includes a detector configured to detect when the carriage is at the stop position.

7. The gripping device of claim 6, wherein the gripping device comprises:

a processor configured to control operation of the gripping device, and the detector is configured to send a signal to the processor when the detector has detected that the carriage is at the stop position.

8. The gripping device of claim 7, wherein the processor is configured to stop operation of the gripping device in response to the signal from the detector.

9. The gripping device of claim 6, wherein the detector comprises:

a micro switch.

10. The gripping device of claim 1, wherein the fixing device is a clamp.

11. The gripping device of claim 1, wherein the cable tensioner is at least partially housed by a portion of the frame, and the frame defines an aperture for receiving the cable into said portion of the frame.

12. The gripping device of claim 11, wherein the cable tensioner comprises:

a cover rigidly mounted to the carriage and configured to cover the aperture in the frame for a full range of travel of the carriage along the track, the cover defining a smaller aperture in communication with the aperture in the frame for receiving the cable.

13. A load handling device for lifting and moving containers stacked in stacks in a grid storage structure having a plurality of tracks arranged in a grid pattern above the stacks of containers, the load handling device comprising:

a body;

a driving mechanism operatively arranged for moving the body on the tracks of the grid storage structure;

the gripping device according to claim 1 for releasably gripping a container in a stack in the grid storage structure; and a lifting mechanism configured to raise and lower the gripping device relative to the body.

14. The load handling device of claim 13, comprising:

the cable having a first end arranged on a reel located on or in the body of the load handling device, and a second end fixed by the fixing device to the frame of the gripping device, wherein the cable is engaged with the cable tensioner between the first and second ends.

15. The load handling device of claim 14, wherein the cable changes direction at the cable tensioner.

16. The load handling device of claim 15, wherein the cable extends substantially vertically between the reel and the cable tensioner, and extends substantially horizontally between the cable tensioner and the fixing device.

17. The load handling device of claim 14, wherein the cable is configured to transfer power from the body of the load handling device to the gripping device and/or transfer data between the body of the load handling device and the gripping device.

18. The load handling device of claim 14, wherein the cable is a flexible flat cable.

* * * * *